US010108937B2

(12) United States Patent
Lee et al.

(10) Patent No.: US 10,108,937 B2
(45) Date of Patent: Oct. 23, 2018

(54) METHOD OF REGISTERING A MEMBERSHIP FOR AN ELECTRONIC PAYMENT, SYSTEM FOR SAME, AND APPARATUS AND TERMINAL THEREOF

(75) Inventors: Won Jun Lee, Seoul (KR); Dong Phil Lim, Seoul (KR); Hye Youn Chung, Seoul (KR); Jong Ho Kim, Gwacheon-si (KR); Se Hyun Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 728 days.

(21) Appl. No.: 14/007,599

(22) PCT Filed: Sep. 4, 2012

(86) PCT No.: PCT/KR2012/007056
§ 371 (c)(1),
(2), (4) Date: Oct. 18, 2013

(87) PCT Pub. No.: WO2013/039304
PCT Pub. Date: Mar. 21, 2013

(65) Prior Publication Data
US 2014/0136421 A1    May 15, 2014

(30) Foreign Application Priority Data
Sep. 14, 2011  (KR) ......................... 10-2011-0092441
Oct. 18, 2011  (KR) ......................... 10-2011-0106362

(51) Int. Cl.
*G06Q 20/06*    (2012.01)
*G06Q 20/40*    (2012.01)
(52) U.S. Cl.
CPC ............. *G06Q 20/06* (2013.01); *G06Q 20/40* (2013.01); *G06Q 20/4014* (2013.01)
(58) Field of Classification Search
None
See application file for complete search history.

(56) References Cited

U.S. PATENT DOCUMENTS

2002/0035539 A1* 3/2002 O'Connell ............. G06Q 20/02
                                                            705/39
2002/0077993 A1* 6/2002 Immonen ............... G06Q 20/04
                                                            705/77

(Continued)

FOREIGN PATENT DOCUMENTS

KR    1020040042522 A    5/2004
KR    1020080083372 A    9/2008

(Continued)

OTHER PUBLICATIONS

Title: Security Without Obscurity : A Guide to Confidentiality, Authentication, and Integrity Authors: Stapleton, Jeffrey James pp. 60 (Year: 2014).*

(Continued)

*Primary Examiner* — Asha Puttaiah
*Assistant Examiner* — Yongsik Park
(74) *Attorney, Agent, or Firm* — Brinks Gilson & Lione

(57) ABSTRACT

The present invention relates to a method of registering a membership for an electronic payment, a system for same, and an apparatus and a terminal thereof. The system according to the present invention includes: a terminal for receiving an application identifier, registering payment means information and processing a membership registration completion, when at least one or more of first authentication information, second authentication information and fourth authentication information input by a user is authenticated; and a membership registration apparatus for, when at least one or more of a first authentication procedure completion signal, a second authentication procedure completion signal and a fourth authentication procedure completion signal is received from the terminal, confirming whether membership application of user information on the terminal is performed, allocating the application identifier to perform electronic payment, and completing membership registration for the (Continued)

user information on the terminal after registering the payment means information.

3 Claims, 12 Drawing Sheets

(56) References Cited

U.S. PATENT DOCUMENTS

| | | | | |
|---|---|---|---|---|
| 2005/0033983 | A1* | 2/2005 | Takekawa | G06F 21/31 |
| | | | | 726/2 |
| 2008/0011833 | A1* | 1/2008 | Saarisalo | G06Q 20/32 |
| | | | | 235/382 |
| 2010/0291904 | A1* | 11/2010 | Musfeldt | G06F 21/604 |
| | | | | 455/414.1 |

FOREIGN PATENT DOCUMENTS

| | | | |
|---|---|---|---|
| KR | 1020100127334 | A | 12/2010 |
| KR | 1020100136306 | A | 12/2010 |
| KR | 1020110003105 | A | 1/2011 |
| KR | 1020110019280 | A | 2/2011 |
| KR | 1020110019887 | A | 3/2011 |
| KR | 1020110062359 | A | 6/2011 |

OTHER PUBLICATIONS

Korean Office Action for application No. 10-2011-0092441 dated May 30, 2014, citing the above reference(s).
International Search Report dated Jan. 2, 2013 for PCT/KR2012/007056, citing the above reference(s).

* cited by examiner

METHOD OF REGISTERING A MEMBERSHIP FOR AN ELECTRONIC PAYMENT, SYSTEM FOR SAME, AND APPARATUS AND TERMINAL THEREOF

TECHNICAL FIELD

The present invention relates to a member registration method for electronic payment, a system, an apparatus, and a terminal for the same and, more particularly, to a member registration method for electronic payment, a system, an apparatus, and a terminal for the same, which enables secure electronic payment by performing member registration depending on whether information input by a user through a terminal to perform the electronic payment is authenticated and can register a payment method more safely by performing one-time password (OTP) authentication depending on payment method information selected by the user through the terminal to perform the electronic payment.

BACKGROUND ART

A credit card, debit card, or payment through a bank account is generally used to make a payment for general commerce or electronic commerce. However, conventional payment methods have the inconvenience to have cash for cash payment, the risk of loss of cash, the inconvenience to return changes, etc. Meanwhile, in addition to these problems, the use of credit cards has been recommended as a way to increase transparency in taxation of business transactions, and many other payment methods have been developed. In particular, with the steady growth of the electronic commerce on the Internet, the payment market is expanding rapidly. Moreover, while most payment methods on the Internet are credit cards and online payments, new payment methods using mobile phones or wired and wireless automatic response services (ARSs) have recently emerged and their frequency of use is increasing rapidly.

However, in the case of these payment methods, it is inconvenient to get a separate module or card, and damage is caused due to leakage of personal information, which is problematic.

Disclosure

Technical Problem

The present invention has been made to solve the above problems, and an object of the present invention is to provide a member registration method for electronic payment, a system, an apparatus, and a terminal for the same, which enables safe electronic payment by performing member registration depending on whether information input by a user through a terminal to perform the electronic payment is authenticated.

Another object of the present invention is to provide a member registration method for electronic payment, a system, an apparatus, and a terminal for the same, which can register a payment method more safely by performing OTP authentication depending on payment method information selected by a user through the terminal to perform the electronic payment.

Technical Solution

According to an aspect of the present invention to achieve the above objects, there is provided a member registration system for electronic payment, the member registration system comprising: a terminal which, when at least one of first authentication information, second authentication information, and fourth authentication information, which are input by a user for member registration, is authenticated, receives an application ID for performing the electronic payment, registers payment method information, and completes the member registration; and a member registration apparatus which, when at least one of a first authentication procedure completion signal, a second authentication procedure completion signal, and a fourth authentication procedure completion signal is received from the terminal, identifies member subscription for user information of the terminal, assigns the application ID for performing the electronic payment, registers the payment method information, and then completes the member registration for the user information of the terminal.

According to another aspect of the present invention to achieve the above objects, there is provided a member registration apparatus comprising: a member subscription identification unit which, when a second authentication procedure completion signal is received from a terminal, identifies member subscription for user information of the terminal; a third authentication processing unit which, when it is determined that a user of the terminal is a non-subscribed member, performs a third authentication procedure using telecommunication company member information included in the user information of the terminal; an application ID assignment unit which, when the third authentication procedure is completed, assigns an application ID to an electronic payment application installed in the terminal; a payment method storage unit which, when a fourth authentication procedure completion signal is received from the terminal, stores payment method information received from the terminal; and a member registration processing unit which completes the member registration for the user information of the terminal.

The member registration apparatus may further comprise a first authentication processing unit which, when a first authentication request signal for approval of execution of the electronic payment application is received from the terminal, requests transmission of a first authentication message from a communication service providing apparatus connected to the terminal, transmits identification information corresponding to the first authentication message to the terminal, and then receives the first authentication procedure completion signal from the terminal.

The payment method information may comprise at least one of credit card information, check card information, phone bill information, and financial account information.

According to still another aspect of the present invention to achieve the above objects, there is provided a terminal comprising: a second authentication procedure performing unit which determines whether second authentication information input by a user is authenticated; an application ID management unit which, when the second authentication information is authenticated, transmits a second authentication procedure completion signal to a member registration apparatus and receives an application ID from the member registration apparatus; a fourth authentication procedure performing unit which, when fourth authentication information input by the user is authenticated, transmits a fourth authentication procedure completion signal to the member registration apparatus; a payment method registration unit which registers payment method information input by the user; and a registration processing unit which receives a registration completion signal from the member registration apparatus and then completes the member registration.

The terminal may further comprise a first authentication procedure performing unit which, when first authentication information input by the user for approval of execution of an electronic payment application is authenticated, transmits a first authentication procedure completion signal to the member registration apparatus.

The first authentication information and identification information may comprise an authentication number comprising a combination of information including at least one of a number, a letter, and a symbol, which are set in advance.

When the second authentication information including at least one of phone number information given to the terminal and resident registration number information on the user of the terminal coincides with the user information of the terminal, the second authentication procedure performing unit may determine that the second authentication information is authenticated.

When the authentication of the second authentication information is determined, the application ID management unit may transmit the second authentication procedure completion signal to the member registration apparatus and then receive the application ID from the member registration apparatus.

When the fourth authentication information including a personal identification number (PIN) input by the user is authenticated, the fourth authentication procedure performing unit may encrypt the application ID and authentication key, store the encrypted application ID and authentication key, and transmit the fourth authentication procedure completion signal to the member registration apparatus.

According to yet another aspect of the present invention to achieve the above objects, there is provided a member registration system for electronic payment, which registers a payment method for the electronic payment, the member registration system comprising: a terminal which transmits payment method information selected by a user's manipulation or command, and when the payment method information is authenticated, stores a one-time password (OTP) authentication key received in response to the payment method information, and then completes the registration of the payment method information; and a payment method registration apparatus which, when the authentication of the received payment method information is completed, generates an OTP authentication key using an external device based on the payment method information, transmits the generated OTP authentication key to the terminal, and registers the payment method information.

According to still yet another aspect of the present invention to achieve the above objects, there is provided a payment method registration apparatus comprising: a payment method reception unit which receives payment method information from a terminal; an OTP authentication key generation unit which generates an OTP authentication key using an external device based on the payment method information; a payment method registration unit which registers the payment method information and then transmits the OTP authentication key to the terminal; and an inquiry control unit which controls the payment method information to be inquired or changed in response to a request of the terminal.

The payment method registration apparatus may further comprise a payment company inquiry unit which inquires payment company information depending on the payment method information and, when a payment method included in the payment method information is credit card information, transmits card company information corresponding to the inquired payment company information to the terminal.

The payment method registration apparatus may further comprise a validity authentication unit which authenticates the validity of payment method authentication information received from the terminal using a card company apparatus corresponding to the card company information.

The OTP authentication key generation unit may generate the OTP authentication key for the validated information using a card company OTP providing apparatus connected to the card company apparatus.

The payment method registration apparatus may further comprise a payment company inquiry unit which inquires payment company information depending on the payment method information and, when a payment method included in the payment method information is phone bill information, transmits phone bill registration request information corresponding to the inquired payment company information to the terminal.

The phone bill registration information may include at least one of phone number information and ID information of the electronic payment application installed in the terminal.

When inquiry request information for the payment method information is received from the terminal, the inquiry control unit may transmit transaction history identification information inquired through a payment mobile web server or a PG web server to the terminal.

According to a further aspect of the present invention to achieve the above objects, there is provided a terminal comprising: a payment method transmission unit which transmits payment method information selected by a user's manipulation or command to a payment method registration apparatus; a payment method storage unit which, when the payment method information is authenticated by the payment method registration apparatus, stores a one-time password (OTP) authentication key received from the payment method registration apparatus in response to the payment method information and then completes the registration of the payment method information; and an inquiry and change unit which transmits inquiry request information or change request information for the payment method information in response to the user's manipulation or command.

The terminal may further comprise a card information input unit which selects any one of information from company information received from the payment method registration apparatus and transmits payment method authentication information including at least one of phone number information for the selected company information, card company identification information, card nickname information, card number information, card expiration date information, virtual card number information, and CVC information to the payment method registration apparatus.

The payment method transmission unit may transmit the payment method information including phone bill information as a payment method to the payment method registration apparatus, and the terminal may further comprise a phone bill information input unit which transmits phone bill registration information including at least one of phone number information and electronic payment application ID information depending on phone bill registration request information received from the payment method registration apparatus to the payment method registration apparatus.

When inquiry request information for the payment method information is input by the user's manipulation or command, the inquiry and change unit may transmit the inquiry request information to the payment method registration apparatus and receive corresponding transaction history identification information from the payment method registration apparatus, and when change request information for the payment method information is input by the user's manipulation or command, the inquiry and change unit may transmit the change request information to the payment method registration apparatus and receive corresponding change completion information from the payment method registration apparatus.

According to another further aspect of the present invention to achieve the above objects, there is provided a member registration method for electronic payment, in which member registration is performed by a member registration apparatus, the member registration method comprising: (a) a member subscription identification step of, when a second authentication procedure completion signal is received from a terminal, identifying member subscription for user information of the terminal; (b) a third authentication processing step of, when it is determined that a user of the terminal is a non-subscribed member, performing a third authentication procedure using telecommunication company member information included in the user information of the terminal; (c) an application ID assignment step of, when the third authentication procedure is completed, assigning an application ID to an electronic payment application installed in the terminal; (d) a payment method storage step of, when a fourth authentication procedure completion signal is received from the terminal, storing payment method information received from the terminal; and (e) a member registration processing step of completing the member registration for the user information of the terminal.

According to still another further aspect of the present invention to achieve the above objects, there is provided a member registration method for electronic payment, in which member registration is performed by a terminal, the member registration method comprising: (a) a second authentication procedure performing step of determining whether second authentication information input by a user is authenticated; (b) an application ID management step of, when the second authentication information is authenticated, transmitting a second authentication procedure completion signal to a member registration apparatus and receiving an application ID from the member registration apparatus; (c) a fourth authentication procedure performing step of, when fourth authentication information input by the user is authenticated, transmitting a fourth authentication procedure completion signal to the member registration apparatus; (d) a payment method registration step of registering payment method information input by the user; and (e) a registration processing step of receiving a registration completion signal from the member registration apparatus and then completing the member registration.

According to yet another further aspect of the present invention to achieve the above objects, there is provided a payment method registration method, in which a payment method is registered by a payment method registration apparatus, the payment method registration method comprising: (a) a payment method reception step of receiving payment method information from a terminal; (b) an OTP authentication key generation step of generating a one-time password (OTP) authentication key using an external device based on the payment method information; (c) a payment method registration step of registering the payment method information and then transmitting the OTP authentication key to the terminal; and (d) a payment method control step of controlling the payment method information to be inquired or changed in response to a request of the terminal.

According to still yet another further aspect of the present invention to achieve the above objects, there is provided a payment method registration method, in which a payment method is registered by a terminal, the payment method registration method comprising: (a) a payment method transmission step of transmitting payment method information selected by a user's manipulation or command to a payment method registration apparatus; (b) a payment method storage step of, when the payment method information is authenticated by the payment method registration apparatus, storing a one-time password (OTP) authentication key received from the payment method registration apparatus in response to the payment method information and then completing the registration of the payment method information; and (c) an inquiry and change step of transmitting inquiry request information or change request information for the payment method information in response to the user's manipulation or command.

Advantageous Effects

According to the embodiments of the present invention, the member registration is performed depending on whether the information input by the user through the terminal to perform the electronic payment is authenticated, and thus it is possible to enable secure electronic payment.

Moreover, there is no need to get a separate module or card to perform the electronic payment and it is possible to minimize the damage due to leakage of personal information.

Furthermore, a plurality of authentication procedures are performed during the member registration for the electronic payment, and thus it is possible to increase the security for the user information. The application ID and authentication key required for the payment are encrypted and stored, and thus it is possible to ensure the security for the electronic payment.

In addition, the OTP authentication is performed depending on the payment method information selected by the user through the terminal to perform the electronic payment, and thus it is possible to register the payment method more safely.

Additionally, the OTP authentication is performed using an external device based on the selected payment method information during the registration of the electronic payment method, and thus it is possible to increase the security for the payment method.

MODE FOR INVENTION

Figure 1:
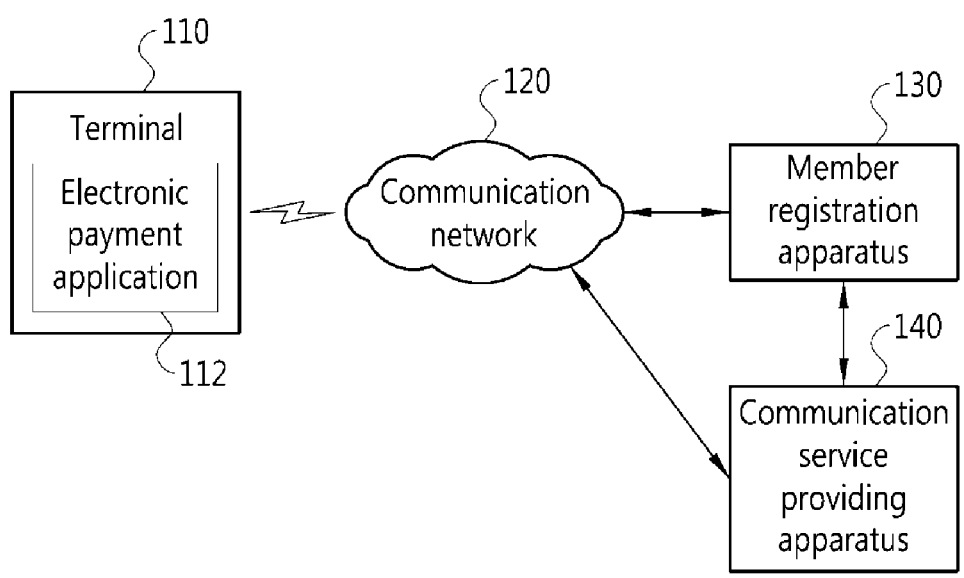
FIG. 1 is a configuration diagram of a member registration system for electronic payment in accordance with a preferred embodiment of the present invention.

Hereinafter, preferred embodiments of the present invention will be described in more detail with reference to the accompanying drawings. In the following description and drawings, the same reference numerals are assigned to the same or similar components, and repeated description thereof will be omitted.

FIG. 1 is a block diagram schematically showing the configuration of a member registration system for electronic payment according to the present embodiment.

The member registration system for electronic payment according to this embodiment comprises a terminal 110, an electronic payment application 112, a communication network 120, a member registration apparatus 130, and a communication service providing apparatus 140. While it is described in this present embodiment that the member registration system for electronic payment comprises only the terminal 110, the electronic payment application 112, the communication network 120, the member registration apparatus 130, and the communication service providing apparatus 140, this is merely illustrative of the spirit of this embodiment of the present invention, and many alterations and modifications may be made to the components included in the member registration system for electronic payment by those having ordinary skill in the art without departing from the spirit of the present invention.

The terminal 110 refers to a terminal that can transmit and receive various data via the communication network 120 depending on a user's key manipulation and may be any one of a tablet PC, a laptop, a personal computer (PC), a smart phone, a personal digital assistant (PDA), and a mobile communication terminal. Moreover, the terminal 110 may be a cloud computing terminal supporting cloud computing which provides services such as reading, writing, and storing of data, networking, use of content, etc. through the communication network 120.

That is, the terminal 110 performs a voice or data communication using the communication network 120 and refers to a terminal equipped with a browser for communication with the member registration apparatus 130 via the communication network 120, a memory for storing programs and protocols, a microprocessor for calculation and control by executing various programs, etc. That is, any terminal is available as long as it provides server-client communication with the member registration apparatus 130 and is a broad concept that encompasses all communication computing devices such as a notebook computer, a mobile communication terminal, a PDA, etc. Meanwhile, the terminal 110 may preferably be provided with a touch screen, but not necessarily limited thereto. While the terminal 110 is implemented separately from the member registration apparatus 130 in this embodiment, the terminal 110 may be implemented as a standalone device that encompasses the member registration apparatus 130 in an actual implementation of the invention.

The terminal 110 executes the electronic payment application 112 in response to the user's manipulation or command and performs member registration through the electronic payment application 112. More specifically, when the terminal 110 is a smart phone, the electronic payment application 112 may be an application downloaded and installed from an application store, whereas when the terminal 110 is a feature phone, it may be an application executed by a virtual machine (VM) downloaded through the communication service providing apparatus 140.

The terminal 110 according to this embodiment performs the member registration through the electronic payment application 112 installed therein. That is, when at least one of first authentication information, second authentication information, and fourth authentication information, which are input by the user for the member registration, is authenticated, the terminal 110 receives an application ID for performing the electronic payment, registers the payment method information, and then completes the member registration. Meanwhile, the terminal 110 should download the electronic payment application 112, and this process will now be described. When the user's selection information through an application providing apparatus or the user's selection information during mobile payment through a payment gateway (PG) is input, the terminal 110 downloads the electronic payment application 112 from the application providing apparatus and installs the downloaded electronic payment application 112.

The operation of the terminal 110 for the member registration will now be described in more detail. The terminal 110 determines whether the second authentication information input by the user is authenticated and, when the second authentication information is authenticated, transmits a second authentication procedure completion signal to the member registration apparatus 130 and receives the application ID from the member registration apparatus 130. Moreover, when the fourth authentication information input by the user is authenticated, the terminal 110 transmits a fourth authentication procedure completion signal to the member registration apparatus 130, registers the payment method information input by the user, receives a registration completion signal from the member registration apparatus 130, and then completes the member registration.

Next, a process in which the terminal 110 performs the first authentication procedure will now be described. The terminal 110 transmits a first authentication request signal for approval of execution of the electronic payment application 112 to the member registration apparatus 130, and when first authentication information corresponding to the first authentication request signal is input, determines whether the first authentication information is authenticated. Then, when it is determined that the first authentication information is authenticated, the terminal 110 transmits a first authentication procedure completion signal to the member registration apparatus 130. Here, the first authentication information and identification information may preferably be an authentication number comprising a combination of information including at least one of a number, a letter, and a symbol, which are set in advance, but not necessarily limited thereto. Moreover, the terminal 110 receives identification information corresponding to the first authentication request signal from the member registration apparatus 130 to perform the first authentication procedure and, when the first authentication information and the identification information coincide with each other, determines that the first authentication information is authenticated. Here, the process of performing the first authentication procedure can be omitted depending on an operating system (OS) installed in the terminal 110. That is, depending on the type of the OS installed in the terminal 110, the member registration apparatus 130 may identify the terminal 110, and thus the first authentication procedure can be performed or omitted. For example, when the OS installed in the terminal 110 is Android, the member registration apparatus 130 can identify the terminal 110, and thus the first authentication procedure can be omitted, whereas when the OS installed in the terminal 110 is iPhone OS (iOS), the member registration apparatus 130 cannot identify the terminal 110, and thus the first authentication procedure should be performed.

Next, a process in which the terminal 110 performs the second authentication procedure will now be described. When second authentication information including at least one of phone number information and resident registration number information on the user of the terminal 110 coincides with the user information of the terminal 110, the terminal 110 determines that the second authentication information is authenticated. At this time, the terminal 110 may determine whether the second authentication information is authenticated using an internal memory storing the user information of the terminal 110 or the member registration apparatus 130.

Next, a process in which the terminal 110 performs the fourth authentication procedure will now be described. When fourth authentication information including a personal identification number (PIN) input by the user is authenticated, the terminal 110 encrypts the application ID and authentication key, stores the encrypted application ID and authentication key, and transmits a fourth authentication procedure completion signal to the member registration apparatus 130. The personal identification number (PIN) is generally set to a four-digit number, and an eight-digit personal unblocking key (PUK) is stored in the PIN. Meanwhile, the PIN may be changed according to the user's need. When the user inputs the PIN incorrectly more than a predetermined number of times in succession, a corresponding subscriber identification module is locked, and thus the PIN can be reset by inputting the PUK. However, also when the PUK is input more than a predetermined number of times, it is necessary to discard the corresponding PUK and get a new PUK.

Meanwhile, a process in which the terminal 110 manages the application ID will now be described. When the authentication of the second authentication information is determined, the terminal 110 transmits a second authentication procedure completion signal to the member registration apparatus 130 and receives the application ID from the member registration apparatus 130. Moreover, a process in which the terminal 110 registers the payment method will now be described. The terminal 110 registers at least one of credit card information, check card information, phone bill information, and financial account information, which are input by the user, as the payment method information. Furthermore, when a registration completion signal is received from the member registration apparatus 130, the terminal 110 outputs a registration completion display page for the member registration.

The electronic payment application 112 refers to software that when at least one of the first authentication information, the second authentication information, and the fourth authentication information, which are input by the user for the member registration, is authenticated, receives the application ID for performing the electronic payment from the member registration apparatus 130, registers the payment method information, and then completes the member registration. The electronic payment application 112 may be implemented or designed to meet various operating system (OS) environments such as iOS, Android, Window Phone 7, etc.

Meanwhile, it is described that the terminal 110 is provided with the electronic payment application 112 to perform the member registration, but this operation process can be achieved only by the electronic payment application 112. That is, the electronic payment application 112 may be installed in the terminal 110 to perform the functions of determining whether the second authentication information input by the user is authenticated, transmitting the second authentication procedure completion signal to the member registration apparatus 130 when the second authentication information is authenticated, receiving the application ID from the member registration apparatus 130, transmitting the fourth authentication procedure completion signal to the member registration apparatus 130 when the fourth authentication information input by the user is authenticated, registering the payment method information input by the user, receiving the registration completion signal from the member registration apparatus 130, and completing the member registration.

The communication network 120 refers to a network that can transmit and receive data via the Internet protocol using various wired and wireless communication technologies such as the Internet network, Intranet network, mobile communication network, satellite communication network, etc. Moreover, the communication network 120 may comprise a cloud computing network which is connected to the member registration apparatus 130 to store computing resources such as hardware, software, etc. and provide the computing resources required by a client to the corresponding terminal 110. Here, the cloud computing refers to a computing environment where information is permanently stored in a server on the Internet and temporarily stored in a client terminal such as a desktop, tablet, notebook, netbook, smart phone, etc., and the cloud computing network refers to a computer environment access network where all users' information is stored in a server on the Internet such that the information can be used anywhere and anytime through various IT devices.

The member registration apparatus 130 has the same configuration as a typical web server or network server. However, in a software configuration, the member registration apparatus 130 includes a program module implemented using languages such as C, C++, Java, Visual Basic, Visual C, etc. The member registration apparatus 130 may be implemented in the form of a web server or network server, and the web server refers to a computer system, which is connected to an unspecified number of clients and/or other servers through an open computer network such as the Internet, receives an operation execution request from a client or another web server, and provides the corresponding operation result, and a computer software (web server program) installed for the same. However, it should be understood that the member registration apparatus 130 is a broad concept that encompasses a series of application programs executed on the web server and various databases built therein according to circumstances, in addition to the above-mentioned web server program. The member registration apparatus 130 may be implemented on a typical server hardware using various web server programs provided for various operating systems such as DOS, Windows, Linux, UNIX, Macintosh, etc. Representative examples thereof may include Website, Internet Information Server (IIS), etc. used in Window environment and CERN, NCSA, APPACH, etc. used in UNIX environment.

The member registration apparatus 130 may be connected to an authentication system for member registration and a payment system. The member registration apparatus 130 classifies member subscription information and stores and manages the information in a member database, which may be implemented inside or outside the member registration apparatus 130. Such a database refers to a typical data structure implemented in a storage space (e.g., a hard disk or memory) of a computer system using a database management system (DBMS), in which retrieval (extraction), deletion, edition, addition, etc. of data can be freely performed. The database may be implemented to achieve the purpose of this embodiment using a relational database management system (RDBMS) such as Oracle, Infomix, Sybase, DB2, etc., an object-oriented database management system (OODBMS) such as Gemston, Orion, O2, etc. or an XML native database such as Excelon, Tamino, Sekaiju, etc., and has appropriate fields or elements to achieve their functions.

Meanwhile, the member registration apparatus 130 may be implemented as an electronic payment apparatus. That is, the member registration apparatus 130 may provide an electronic payment service in conjunction with the electronic payment application 112 installed in the terminal 110. When a payment request signal is received from the electronic payment application 112 installed in the terminal 100, the member registration apparatus 130 may perform the electronic payment in conjunction with a financial company apparatus.

When at least one of the first authentication procedure completion signal, the second authentication procedure completion signal, and the fourth authentication procedure completion signal is received from the terminal 110, the member registration apparatus 130 according to this embodiment identifies the member subscription for the user information of the terminal 110, assigns an application ID for performing the electronic payment, registers the payment method information, and then completes the member registration for the user information of the terminal 110. Here, the payment method information includes at least one of credit card information, check card information, phone bill information, and financial account information.

The operation of the member registration apparatus 130 for the member registration will now be described in more detail. When the second authentication procedure completion signal is received from the terminal 110, the member registration apparatus 130 identifies the member subscription for the user information of the terminal 110 and, when it is determined that the user of the terminal 110 is a non-subscribed member, performs a third authentication procedure using telecommunication company member information included in the user information of the terminal 110. Then, when the third authentication procedure is completed, the member registration apparatus 130 assigns an application ID to the electronic payment application 112 installed in the terminal 110 and, when a fourth authentication procedure completion signal is received from the terminal 110, stores payment method information received from the terminal 110, and then completes the member registration for the user information of the terminal 110.

The operation of the member registration apparatus 130 to allow the terminal 110 to perform the first authentication procedure will now be described. When a first authentication request signal for approval of execution of the electronic payment application 112 is received from the terminal 110, the member registration apparatus 130 requests transmission of a first authentication message from the communication service providing apparatus 140 connected to the terminal 110, transmits identification information corresponding to the first authentication message to the terminal 110, and receives the first authentication procedure completion signal from the terminal 110. At this time, the member registration apparatus 130 controls the communication service providing apparatus 140 to transmit the first authentication message in a predetermined message specification to the terminal 110 such that the terminal 110 performs the first authentication procedure. Here, the predetermined message specification may preferably be SMS, but not necessarily limited thereto, and may be an IP-based packet message.

Moreover, in the member registration process, the member registration apparatus 130 performs the fourth authentication to finally complete the member registration, which will now be described in detail. That is, the member registration apparatus 130 performs the third authentication procedure using the telecommunication company member information included in the user information of the terminal 110. The member registration apparatus 130 determines whether the telecommunication company member information is authenticated using the communication service providing apparatus 140 connected to the terminal 110 and, when it is determined that the telecommunication company member information is authenticated, completes the member registration. At this time, when there is information that coincides with owner information of the terminal 110 or corporate name information included in the telecommunication company member information, the member registration apparatus 130 authenticates the telecommunication company member information using the communication service providing apparatus 140.

Meanwhile, the member registration apparatus 130 according to this embodiment may further comprise a cloud computing storage unit and a cloud computing unit for cloud computing. When the second authentication procedure completion signal is received from the terminal 110, the cloud computing storage unit stores the functions of identifying the member subscription for the user information of the terminal 110, performing the third authentication procedure using the telecommunication company member information included in the user information of the terminal 110 when it is determined that the user of the terminal 110 is a non-subscribed member, assigning an application ID to the electronic payment application 112 installed in the terminal 110 when the third authentication procedure is completed, storing the payment method information received from the terminal 110 when the fourth authentication procedure completion signal is received from the terminal 110, and completing the member registration in a storage medium, and the clouding computing unit allows the terminal 110 to read and write data from and to the storage medium.

The communication service providing apparatus 140 refers to an apparatus that performs various functions required for wireless call processing in conjunction with the communication network 120, such as basic and additional service processing for allowing the terminal 110 to receive a voice or data communication service, subscribers' incoming and outgoing call processing, location registration procedure and handoff procedure processing, connection with other networks, etc.

When a control signal is received from the member registration apparatus 130 to transmit the first authentication message, the communication service providing apparatus 140 according to this embodiment transmits the first authentication message in a predetermined message specification to the terminal 110. At this time, the communication service providing apparatus 140 may use a message center to transmit the first authentication message in the predetermined message specification. Here, the message center may preferably be an SMS center, but not necessarily limited thereto. The message center refers to an apparatus that transmits the requested message to the terminal 110 corresponding to a predetermined transmitting number in conjunction with the communication network 120. Meanwhile, the predetermined message specification may preferably be SMS, but not necessarily limited thereto, and may be an IP-based packet message. Moreover, the first authentication message may preferably be an authentication number comprising a combination of information including at least one of a number, a letter, and a symbol, which are set in advance. Therefore, when the user of the terminal 110 that has received the first authentication message inputs the corresponding authentication number to the electronic payment application 112 of the terminal 110, the terminal 110 can perform the first authentication procedure using the electronic payment application 112.

Figure 2:
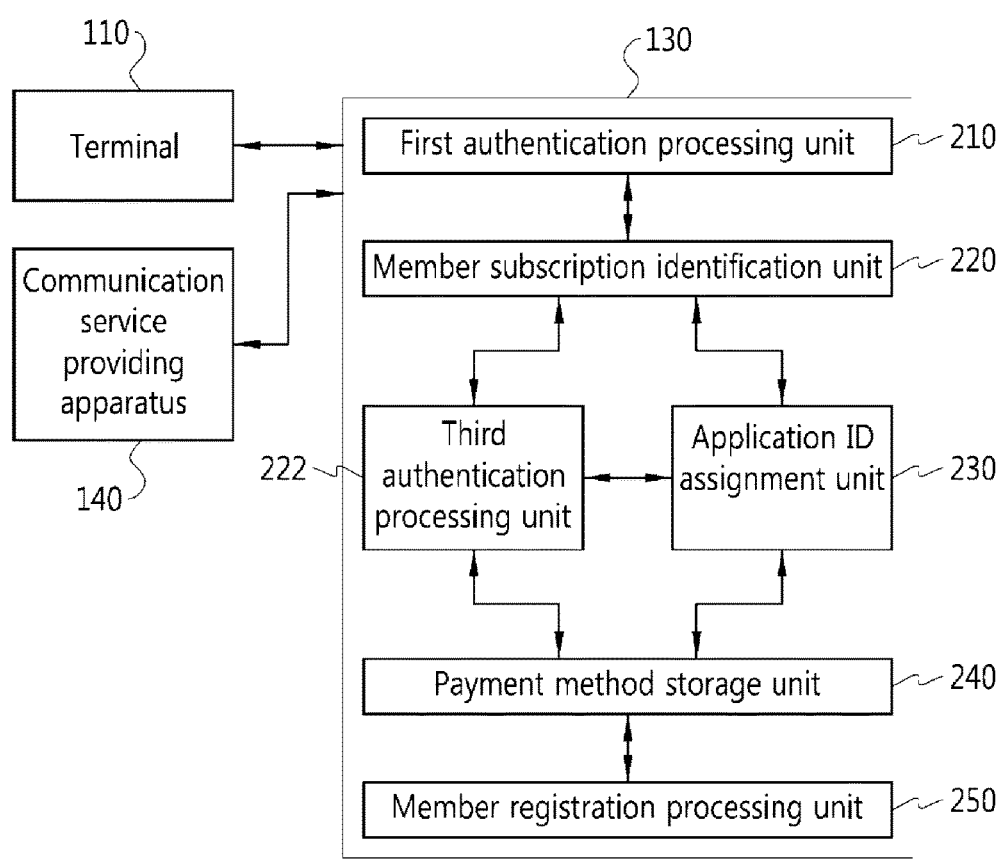
FIG. 2 is a control block diagram of a member registration apparatus in accordance with a preferred embodiment of the present invention.

FIG. 2 is a block diagram schematically showing the configuration of a member registration apparatus according to the present embodiment.

The member registration apparatus 130 according to this embodiment comprises a first authentication processing unit 210, a member subscription identification unit 220, a third authentication processing unit 222, an application ID assignment unit 230, a payment method storage unit 240, and a member registration processing unit 250. While it is described in this present embodiment that the member registration apparatus 130 comprises only the first authentication processing unit 210, the member subscription identification unit 220, the third authentication processing unit 222, the application ID assignment unit 230, the payment method storage unit 240, and the member registration processing unit 250, this is merely illustrative of the spirit of this embodiment of the present invention, and many alterations and modifications may be made to the components included in the member registration apparatus 130 by those having ordinary skill in the art without departing from the spirit of the present invention.

The first authentication processing unit 210 receives a first authentication procedure completion signal for approval of execution of the electronic payment application 112 from the terminal 110. Moreover, when the first authentication procedure completion signal for approval of execution of the electronic payment application 112 is received from the terminal 110, the first authentication processing unit 210 requests transmission of a first authentication message from the communication service providing apparatus 140 connected to the terminal 110, transmits identification information corresponding to the first authentication message to the terminal 110, and receives the first authentication procedure completion signal from the terminal 110. Moreover, the first authentication processing unit 210 controls the communication service providing apparatus 140 to transmit the first authentication message in a predetermined message specification to the terminal 110.

When a second authentication procedure completion signal is received from the terminal 110, the member subscription identification unit 220 identifies the member subscription for the user information of the terminal 110. That is, when it is determined that the user of the terminal 110 is a non-subscribed member, the member subscription identification unit 220 allows the member registration procedure to be performed. Here, in the case of a subscribed member, the member registration procedure can be performed when the terminal is replaced and thus the electronic payment application is to be newly installed. When it is determined by the member subscription identification unit 220 that the user of the terminal 110 is a subscribed member, the third authentication processing unit 222 performs the third authentication procedure using the telecommunication company member information included in the user information of the terminal 100. Moreover, the third authentication processing unit 222 determines whether the telecommunication company member information is authenticated using the communication service providing apparatus 140 connected to the terminal 110 to perform the third authentication procedure and, it is determined that the telecommunication company member information is authenticated, completes the member registration. Moreover, when there is information that coincides with owner information of the terminal 110 or corporate name information included in the telecommunication company member information, the third authentication processing unit 222 authenticates the telecommunication company member information using the communication service providing apparatus 140.

When it is determined that the user of the terminal 110 is a non-subscribed member, the application ID assignment unit 230 assigns an application ID to the electronic payment application 112. The payment method storage unit 240 stores the payment method information received from the terminal 110. Here, the payment method information includes at least one of credit card information, check card information, phone bill information, and financial account information. When a fourth authentication procedure completion signal is received from the terminal 110, the member registration processing unit 250 completes the member registration for the user information of the terminal 110.

Figure 3:
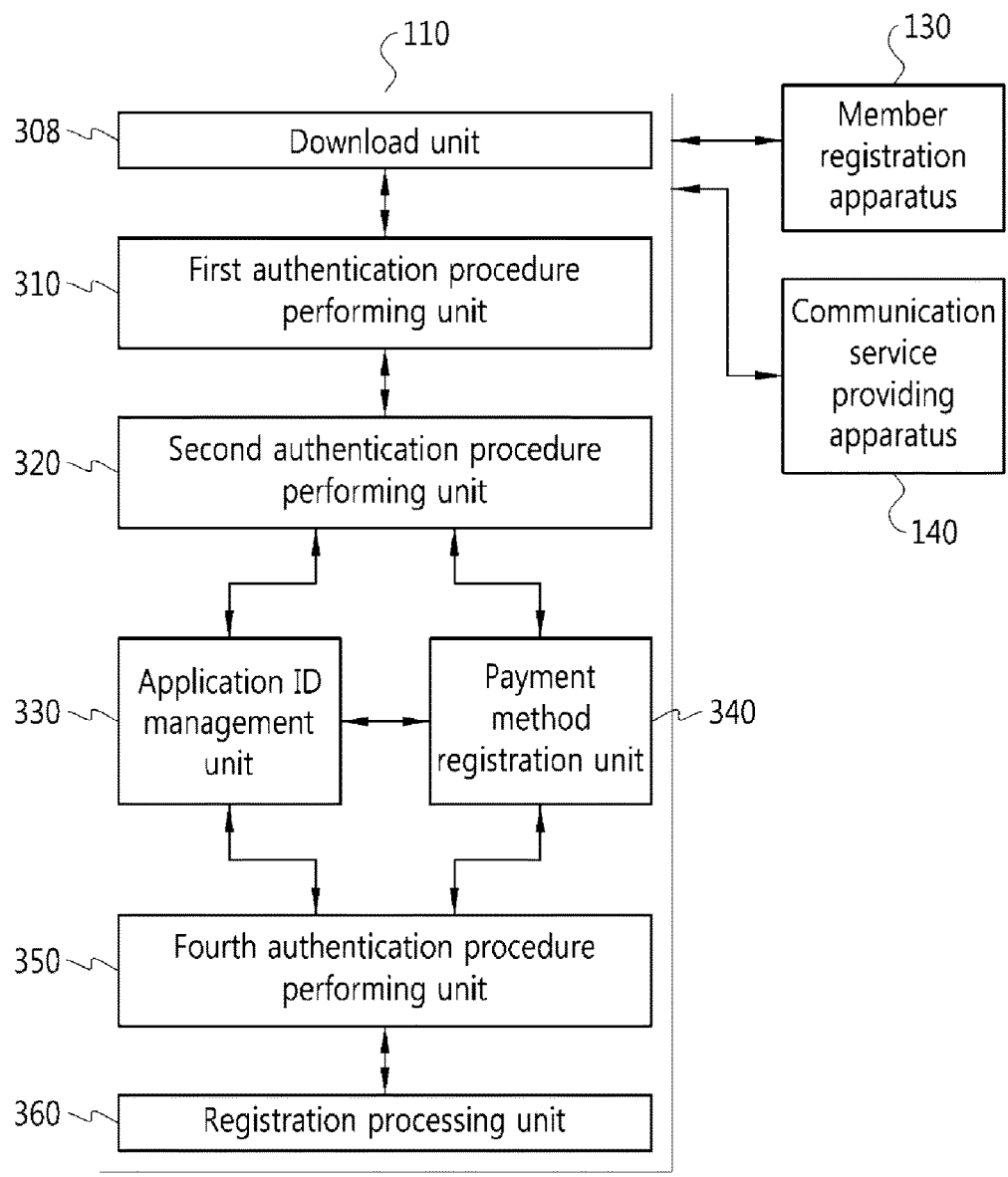
FIG. 3 is a control block diagram of a terminal for electronic payment in accordance with a preferred embodiment of the present invention.

FIG. 3 is a block diagram schematically showing the configuration of a terminal according to the present embodiment.

The terminal 110 according to this embodiment comprises a download unit 308, a first authentication procedure performing unit 310, a second authentication procedure performing unit 320, an application ID management unit 330, a payment method registration unit 340, a fourth authentication procedure performing unit 350, and a registration processing unit 360. While it is described in this present embodiment that the terminal 110 comprises only the download unit 308, the first authentication procedure performing unit 310, the second authentication procedure performing unit 320, the application ID management unit 330, the payment method registration unit 340, the fourth authentication procedure performing unit 350, and the registration processing unit 360, this is merely illustrative of the spirit of this embodiment of the present invention, and many alterations and modifications may be made to the components included in the terminal 110 by those having ordinary skill in the art without departing from the spirit of the present invention. Meanwhile, the download unit 308, the first authentication procedure performing unit 310, the second authentication procedure performing unit 320, the application ID management unit 330, the payment method registration unit 340, the fourth authentication procedure performing unit 350, and the registration processing unit 360 shown in FIG. 3 may be implemented as the electronic payment application 112.

When at least one of the user's selection information through the application providing apparatus and the user's selection information during mobile payment through the PG is input, the download unit 308 downloads the electronic payment application 112 from the application providing apparatus. When first authentication information input by the user for approval of execution of the electronic payment application 112 is authenticated, the first authentication procedure performing unit 310 transmits a first authentication procedure completion signal to the member registration apparatus 130.

Here, the first authentication information may preferably be an authentication number comprising a combination of information including at least one of a number, a letter, and a symbol, which are set in advance, but not necessarily limited thereto. Moreover, the first authentication procedure performing unit 310 transmits a first authentication request signal for approval of execution of the electronic payment application 112 to the member registration apparatus 130, and when the first authentication information corresponding to the first authentication request signal is input, determines whether the first authentication information is authenticated. Then, when it is determined that the first authentication information is authenticated, the first authentication procedure performing unit 310 transmits the first authentication procedure completion signal to the member registration apparatus 130.

Furthermore, the first authentication procedure performing unit 310 receives identification information corresponding to the first authentication request signal from the member registration apparatus 130 and, when the first authentication information and the identification information coincide with each other, determines that the first authentication information is authenticated. In addition, the first authentication procedure performing unit 310 installs the downloaded electronic payment application 112 and, when an approval signal for using the electronic payment application 112 is input, transmits the first authentication request signal to the member registration apparatus 130.

When the first authentication information is authenticated, the second authentication procedure performing unit 320 determines whether the second authentication information input by the user is authenticated. Moreover, when second authentication information including at least one of phone number information given to the terminal 110 and resident registration number information on the user of the terminal 110 coincides with the user information of the terminal 110, the second authentication procedure performing unit 320 determines that the second authentication information is authenticated. At this time, the second authentication procedure performing unit 320 determines whether the second authentication information is authenticated using an internal memory storing the user information of the terminal 110 or the member registration apparatus 130. When the second authentication information is authenticated, the application ID management unit 330 transmits a second authentication procedure completion signal to the member registration apparatus 130 and receives an application ID from the member registration apparatus 130. Moreover, when the authentication of the second authentication information is identified, the application ID management unit 330 transmits a second authentication procedure completion signal to the member registration apparatus 130 and then receives the application ID from the member registration apparatus 130.

The payment method registration unit 340 registers the payment method information input by the user. Moreover, the payment method registration unit 340 registers at least one of credit card information, check card information, phone bill information, and financial account information, which are input by the user, as the payment method information. When the fourth authentication information input by the user is authenticated, the fourth authentication procedure performing unit 350 transmits a fourth authentication procedure completion signal to the member registration apparatus 130. Moreover, when the fourth authentication information including the PIN input by the user is authenticated, the fourth authentication procedure performing unit 350 encrypts the application ID and authentication key, stores the encrypted application ID and authentication key, and transmits the fourth authentication procedure completion signal to the member registration apparatus 130. The registration processing unit 360 receives a registration completion signal from the member registration apparatus 130 and then completes the member registration. Moreover, when the registration completion signal is received from the member registration apparatus 130, the registration processing unit 360 outputs a registration completion display page.

Figure 4:
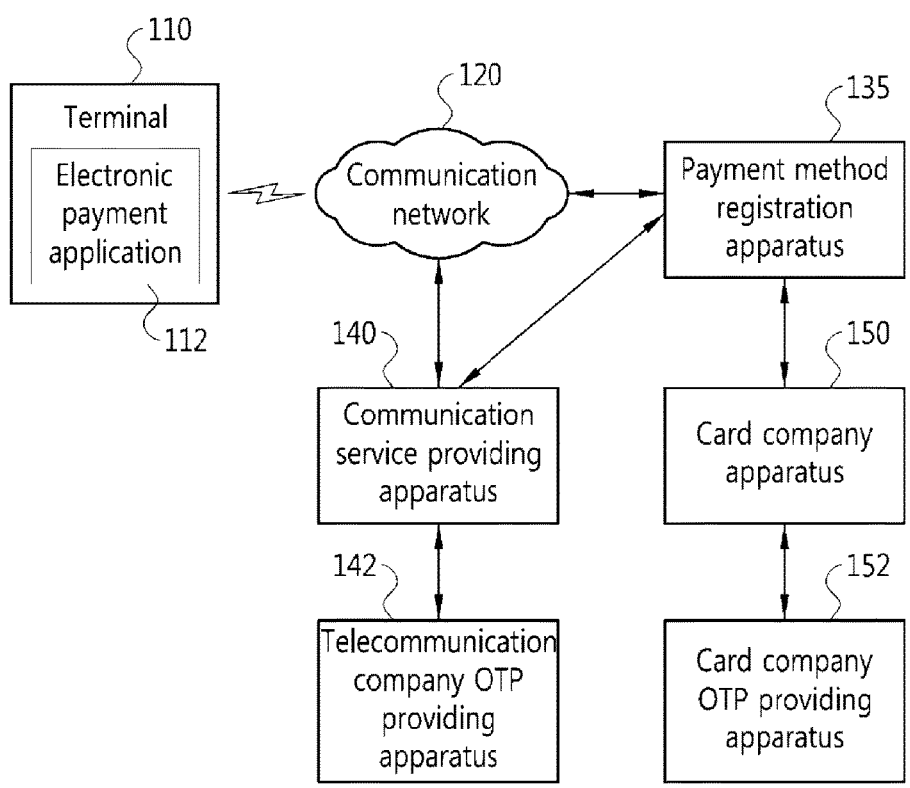
FIG. 4 is a configuration diagram of a payment method registration system in accordance with a preferred embodiment of the present invention.

FIG. 4 is a block diagram schematically showing the configuration of a payment method registration system according to the present embodiment.

The payment method registration system according to this embodiment comprises a terminal 110, an electronic payment application 112, a communication network 120, a payment method registration apparatus 135, a communication service providing apparatus 140, a telecommunication company OTP providing apparatus 142, a card company apparatus 150, and a card company OTP providing apparatus 152.

The terminal 110 performs the member registration through the electronic payment application 112 installed therein. Then, when at least one of first authentication information, second authentication information, and fourth authentication information, which are input by the user for the member registration, is authenticated, the terminal 110 receives an application ID for performing the electronic payment, registers payment method information, and then completes the member registration.

In the member registration process, the terminal 110 determines whether the second authentication information input by the user is authenticated and, when the second authentication information is authenticated, transmits a second authentication procedure completion signal to the payment method registration apparatus 135 and receives the application ID from the payment method registration apparatus 135. Moreover, when the fourth authentication information input by the user is authenticated, the terminal 110 transmits a fourth authentication procedure completion signal to the payment method registration apparatus 135, registers the payment method information input by the user, receives a registration completion signal from the payment method registration apparatus 135, and then completes the member registration.

Moreover, in the member registration process, the terminal 110 transmits a first authentication request signal for approval of execution of the electronic payment application 112 to the payment method registration apparatus 135 to perform the first authentication procedure, and when first authentication information corresponding to the first authentication request signal is input, determines whether the first authentication information is authenticated. Then, when it is determined that the first authentication information is authenticated, the terminal 110 transmits the first authentication procedure completion signal to the payment method registration apparatus 135. Here, the first authentication information and identification information may preferably be an authentication number comprising a combination of information including at least one of a number, a letter, and a symbol, which are set in advance, but not necessarily limited thereto. Moreover, the terminal 110 receives identification information corresponding to the first authentication request signal from the payment method registration apparatus 135 to perform the first authentication procedure and, when the first authentication information and the identification information coincide with each other, determines that the first authentication information is authenticated. Here, the process of performing the first authentication procedure can be omitted depending on an operating system (OS) installed in the terminal 110. That is, depending on the type of the OS installed in the terminal 110, the payment method registration apparatus 135 may identify the terminal 110, and thus the first authentication procedure can be performed or omitted. For example, when the OS installed in the terminal 110 is Android, the payment method registration apparatus 135 can identify the terminal 110, and thus the first authentication procedure can be omitted, whereas when the OS installed in the terminal 110 is iPhone OS (iOS), the payment method registration apparatus 135 cannot identify the terminal 110, and thus the first authentication procedure should be performed.

Furthermore, in the member registration process, when second authentication information including at least one of phone number information and resident registration number information on the user of the terminal 110 coincides with the user information of the terminal 110, the terminal 110 determines that the second authentication information is authenticated. At this time, the terminal 110 may determine whether the second authentication information is authenticated using an internal memory storing the user information of the terminal 110 or the payment method registration apparatus 135.

In addition, in the member registration process, when the fourth authentication information including the PIN input by the user is authenticated, the terminal 110 encrypts the application ID and authentication key, stores the encrypted application ID and authentication key, and transmits a fourth authentication procedure completion signal to the payment method registration apparatus 135. Here, the personal identification number (PIN) is generally set to a four-digit number, and an eight-digit personal unblocking key (PUK) is stored in the PIN. Meanwhile, the PIN may be changed according to the user's need. When the user inputs the PIN incorrectly more than a predetermined number of times in succession, a corresponding subscriber identification module is locked, and thus the PIN can be reset by inputting the PUK. However, also when the PUK is input more than a predetermined number of times, it is necessary to discard the corresponding PUK and get a new PUK.

Moreover, in the member registration process, a process in which the terminal 110 manages the application ID will now be described. When the authentication of the second authentication information is determined, the terminal 110 transmits a second authentication procedure completion signal to the payment method registration apparatus 135 and receives the application ID from the method registration apparatus 135. Moreover, a process in which the terminal 110 registers the payment method will now be described.

The terminal 110 registers at least one of credit card information, check card information, phone bill information, and financial account information, which are input by the user, as the payment method information. Meanwhile, the phone bill refers to a payment method in which a corresponding fee to be paid by the user during the electronic payment is added to communication fees of the terminal 110. Furthermore, when a registration completion signal is received from the payment method registration apparatus 135 for the member registration, the terminal 110 outputs a registration completion display page.

A process of registering a payment method according to this embodiment invention will now be described. The terminal 110 transmits payment method information selected by the user's manipulation or command to the payment method registration apparatus 135, and when the payment method information is authenticated, stores an OTP authentication key received from the payment method registration apparatus 135 in response to the payment method information, and then completes the registration of the payment method information. Here, the payment method information includes at least one of credit card information, check card information, phone bill information, and financial account information. At this time, the terminal 110 receives an encrypted OTP authentication key from the payment method registration apparatus 135, decrypts the encrypted OTP authentication key, re-encrypts the decrypted OTP authentication key together with information (e.g., PIN information) required for the authentication, and stores the resulting OTP authentication key. For this operation of the terminal 110, the terminal 110 uses the electronic payment application 112 installed therein. The process in which the terminal 110 registers the payment method will now be described in more detail. The terminal 110 transmits payment method information selected by the user's manipulation or command to the payment method registration apparatus 135, and when the payment method information is authenticated by the payment method registration apparatus 135, stores the OTP authentication key received from the payment method registration apparatus 135 in response to the payment method information, and then completes the registration of the payment method information. Then, the terminal 100 transmits inquiry request information or change request information for the payment method information in response to the user's manipulation or command.

A process in which the terminal 110 according to this embodiment registers credit card information will now be described. The terminal 110 transmits payment method information including the credit card information as the payment method to the payment method registration apparatus 135, selects any one of information from company information received from the payment method registration apparatus 135, and transmits payment method authentication information including at least one of phone number information for the selected company information, card company identification information, card nickname information, card number information, card expiration date information, virtual card number information, and CVC information to the payment method registration apparatus 135. Then, the terminal 110 stores an OTP authentication key received from the payment method registration apparatus 135 in response to the payment method information as the payment method information and then completes the registration of the payment method information.

A process in which the terminal 110 according to this embodiment registers phone bill information will now be described. The terminal 110 transmits payment method information including the phone bill information as the payment method to the payment method registration apparatus 135 and transmits phone bill registration information including at least one of phone number information and electronic payment application ID information depending on phone bill registration request information received from the payment method registration apparatus 135 to the payment method registration apparatus 135. Then, the terminal 110 stores an OTP authentication key received in response to the phone bill information as the payment method information from the payment method registration apparatus 135 and then completes the registration of the payment method information.

Meanwhile, a process in which the terminal 110 according to this embodiment inquires or changes the payment method will now be described. When inquiry request information for the payment method information is input by the user's manipulation or command, the terminal 110 transmits the inquiry request information to the payment method registration apparatus 135 and receives corresponding transaction history identification information from the payment method registration apparatus 135. Moreover, when change request information for the payment method information is input by the user's manipulation or command, the terminal 110 transmits the change request information to the payment method registration apparatus 135 and receives corresponding change completion information from the payment method registration apparatus 135.

The electronic payment application 112 refers to software that transmits payment method information selected by the user's manipulation or command, and when the payment method information is authenticated, stores an OTP authentication key received in response to the payment method information, and then completes the registration of the payment method information. The electronic payment application 112 may be implemented or designed to meet various operating system (OS) environments such as iOS, Android, Window Phone 7, etc.

Meanwhile, it is described in this embodiment that the terminal 110 is provided with the electronic payment application 112 to perform the member registration, but this operation process can be achieved only by the electronic payment application 112. That is, the electronic payment application 112 may be installed in the terminal 110 to perform the functions of transmitting the payment method information selected by the user's manipulation or command, storing an OTP authentication key received in response to the payment method information from the payment method registration apparatus 135 when the payment method information is authenticated, completing the registration of the payment method information, and transmitting inquiry request information or change request information for the payment method information in response to the user's manipulation or command.

The communication network 120 refers to a network that can transmit and receive data via the Internet protocol using various wired and wireless communication technologies such as the Internet network, Intranet network, mobile communication network, satellite communication network, etc. Moreover, the communication network 120 may comprise a cloud computing network which is connected to the payment method registration apparatus 135 to store computing resources such as hardware, software, etc. and provide the computing resources required by a client to the corresponding terminal 110.

The payment method registration apparatus 135 has the same configuration as a typical web server or network server. However, in a software configuration, the payment method registration apparatus 135 includes a program module implemented using languages such as C, C++, Java, Visual Basic, Visual C, etc. The payment method registration apparatus 135 may be implemented in the form of a web server or network server, and the web server refers to a computer system, which is connected to an unspecified number of clients and/or other servers through an open computer network such as the Internet, receives an operation execution request from a client or another web server, and provides the corresponding operation result, and a computer software (web server program) installed for the same. However, it should be understood that the payment method registration apparatus 135 is a broad concept that encompasses a series of application programs executed on the web server and various databases built therein according to circumstances, in addition to the above-mentioned web server program. The payment method registration apparatus 135 may be implemented on a typical server hardware using various web server programs provided for various operating systems such as DOS, Windows, Linux, UNIX, Macintosh, etc. Representative examples thereof may include Website, Internet Information Server (IIS), etc. used in Window environment and CERN, NCSA, APPACH, etc. used in UNIX environment.

Moreover, the payment method registration apparatus 135 may be connected to an authentication system for member registration and a payment system. Furthermore, the payment method registration apparatus 135 classifies member subscription information and stores and manages the information in a member database, which may be implemented inside or outside the payment method registration apparatus 135. Such a database refers to a typical data structure implemented in a storage space (e.g., a hard disk or memory) of a computer system using a database management system (DBMS), in which retrieval (extraction), deletion, edition, addition, etc. of data can be freely performed. The database may be implemented to achieve the purpose of this embodiment using a relational database management system (RDBMS) such as Oracle, Infomix, Sybase, DB2, etc., an object-oriented database management system (OODBMS) such as Gemston, Orion, O2, etc. or an XML native database such as Excelon, Tamino, Sekaiju, etc., and has appropriate fields or elements to achieve their functions.

Meanwhile, the payment method registration apparatus 135 may be implemented as an electronic payment apparatus. That is, the payment method registration apparatus 135 may provide an electronic payment service in conjunction with the electronic payment application 112 installed in the terminal 110. When a payment request signal is received from the electronic payment application 112 installed in the terminal 110, the payment method registration apparatus 135 may perform the electronic payment in conjunction with a financial company apparatus.

In the member registration process, when at least one of the first authentication procedure completion signal, the second authentication procedure completion signal, and the fourth authentication procedure completion signal is received from the terminal 110, the payment method registration apparatus 135 identifies the member subscription for the user information of the terminal 110, assigns an application ID for performing the electronic payment, registers the payment method information, and then completes the member registration for the user information of the terminal 110. Here, the payment method information includes at least one of credit card information, check card information, phone bill information, and financial account information.

Moreover, in the member registration process, when the second authentication procedure completion signal is received from the terminal 110, the payment method registration apparatus 135 identifies the member subscription for the user information of the terminal 110 and, when it is determined that the user of the terminal 110 is a non-subscribed member, performs a third authentication procedure using telecommunication company member information included in the user information of the terminal 110. Then, when the third authentication procedure is completed, the payment method registration apparatus 135 assigns an application ID to the electronic payment application 112 installed in the terminal 110 and, when the fourth authentication procedure completion signal is received from the terminal 110, stores the payment method information received from the terminal 110, and then completes the member registration for the user information of the terminal 110.

Furthermore, in the member registration process, in order for the terminal 110 to perform the first authentication procedure, when a first authentication request signal for approval of execution of the electronic payment application 112 is received from the terminal 110, the payment method registration apparatus 135 requests transmission of a first authentication message from the communication service providing apparatus 140 connected to the terminal 110, transmits identification information corresponding to the first authentication message to the terminal 110, and receives the first authentication procedure completion signal from the terminal 110. At this time, the payment method registration apparatus 135 controls the communication service providing apparatus 140 to transmit the first authentication message in a predetermined message specification to the terminal 110 such that the terminal 110 performs the first authentication procedure. Here, the predetermined message specification may preferably be SMS, but not necessarily limited thereto, and may be an IP-based packet message.

In addition, in the member registration process, the payment method registration apparatus 135 performs the third authentication procedure using the telecommunication company member information included in the user information of the terminal 110. The payment method registration apparatus 135 determines whether the telecommunication company member information is authenticated using the communication service providing apparatus 140 connected to the terminal 110 and, when it is determined that the telecommunication company member information is authenticated, completes the member registration. At this time, when there is information that coincides with owner information of the terminal 110 or corporate name information included in the telecommunication company member information, the payment method registration apparatus 135 authenticates the telecommunication company member information using the communication service providing apparatus 140.

When the authentication of the payment method information received from the terminal 110 is completed, the payment method registration apparatus 135 generates an OTP authentication key using an external device based on the payment method information, transmits the generated OTP authentication key to the terminal 110, and registers the payment method information. At this time, the payment method registration apparatus 135 transmits the OTP authentication key after encryption to the terminal 110, and this member registration process of the payment method registration apparatus 135 will now be described in more detail. The payment method registration apparatus 135 receives payment method information from the terminal 110, generates an OTP authentication key using an external device based on the payment method information, registers the payment method information, transmits the generated OTP authentication key to the terminal 110, and controls the payment method information to be inquired or changed in response to a request of the terminal 110.

A process in which the payment method registration apparatus 135 according to this embodiment registers the credit card information will now be described. The payment method registration apparatus 135 inquires payment company information depending on the payment method information, and when the payment method included in the payment method information is credit card information, transmits card company information corresponding to the inquired payment company information to the terminal 110. For the authentication of the validity of the credit card during the registration of the credit card information, the payment method registration apparatus 135 authenticates the validity of payment method authentication information received from the terminal 110 using the card company apparatus 150 corresponding to the card company information. Here, the payment method authentication information includes at least one of phone number information, card company identification information, card nickname information, card number information, card expiration date information, virtual card number information, and CVC information, and the card nickname information refers to the information input by the user's manipulation or command. At this time, the payment method registration apparatus 135 transmits at least one of card nickname information, phone number information, card expiration date information, virtual card number information, CVC information, and identification information of the terminal 110 to the card company apparatus 150 to authenticate the validity. Moreover, for the generation of the OTP authentication key during the registration of the credit card information, the payment method registration apparatus 135 generates an OTP authentication key for the validated information using a card company OTP providing apparatus 152 connected to the card company apparatus 150. Furthermore, for the registration of the payment method during the registration of the credit card information, when at least one of the OTP authentication key, card nickname information, virtual card number information, and validated information is identified, the payment method registration apparatus 135 registers the payment method information.

A process in which the payment method registration apparatus 135 according to this embodiment registers the phone bill information will now be described. The payment method registration apparatus 135 inquires payment company information depending on the payment method information, and when the payment method included in the payment method information is phone bill information, transmits phone bill registration request information corresponding to the inquired payment company information to the terminal 110. For the generation of the OTP authentication key during registration of a phone bill, when phone bill registration information is received from the terminal 110, the payment method registration apparatus 135 generates an OTP authentication key for the phone bill registration information using the communication service providing apparatus 140 connected to the terminal 110. Here, the phone bill information includes at least one of phone number information and ID information of the electronic payment application installed in the terminal 110. Moreover, for the generation of the OTP authentication during the registration of the phone bill, the payment method registration apparatus 135 transmits an OTP authentication request signal for the phone number information to the communication service providing apparatus 140 and receives a corresponding OTP authentication key from the communication service providing apparatus 140. At this time, the communication service providing apparatus 140 generates an OTP authentication key for the payment method information using the telecommunication company OTP providing apparatus 142 connected thereto.

A process in which the payment method registration apparatus 135 according to this embodiment inquires or changes the payment method information will now be described. When inquiry request information for the payment method information is received from the terminal 110, the payment method registration apparatus 135 transmits transaction history identification information inquired through a payment mobile web server or a PG web server to the terminal 110. Moreover, when change request information for the payment method information is received from the terminal 110, the payment method registration apparatus 135 changes the payment method based on the change request information and transmits change completion information to the terminal 110.

Meanwhile, the payment method registration apparatus 135 may further comprise a cloud computing storage unit and a cloud computing unit for cloud computing. The cloud computing storage unit stores the functions of receiving payment request information from the terminal 110, generating an OTP authentication key using an external device based on the payment method information, registering the payment method information, transmitting the generated OTP authentication key to the terminal 110, and controlling the payment method information to be inquired or changed in response to a request of the terminal 110 in a storage medium, and the clouding computing unit allows the terminal 110 to read and write data from and to the storage medium.

The communication service providing apparatus 140 refers to an apparatus that performs various functions required for wireless call processing in conjunction with the communication network 120, such as basic and additional service processing for allowing the terminal 110 to receive a voice or data communication service, subscribers' incoming and outgoing call processing, location registration procedure and handoff procedure processing, connection with other networks, etc. When a control signal is received from the payment method registration apparatus 135 to transmit a first authentication message for the member registration, the communication service providing apparatus 140 transmits the first authentication message in a predetermined message specification to the terminal 110. Here, the communication service providing apparatus 140 may use a message center to transmit the first authentication message in the predetermined message specification. Here, the message center may preferably be an SMS center, but not necessarily limited thereto. The message center refers to an apparatus that transmits the requested message to the terminal 110 corresponding to a predetermined transmitting number in conjunction with the communication network 120. Meanwhile, the predetermined message specification may preferably be SMS, but not necessarily limited thereto, and may be an IP-based packet message. Moreover, the first authentication message may preferably be an authentication number comprising a combination of information including at least one of a number, a letter, and a symbol, which are set in advance. Therefore, when the user of the terminal 110 that has received the first authentication message inputs the corresponding authentication number to the electronic payment application 112 of the terminal 110, the terminal 110 can perform the first authentication procedure using the electronic payment application 112. Meanwhile, when an OTP authentication key request signal is received from the payment method registration apparatus 135, the communication service providing apparatus 140 according to this embodiment generates an OTP authentication key through the telecommunication company OTP providing apparatus 142 connected thereto and transmits the generated OTP authentication key to the payment method registration apparatus 135.

The telecommunication company OTP providing apparatus 142 refers to an apparatus that provides an OTP for the telecommunication company in conjunction with the communication service providing apparatus 140. Here, the one-time password (OTP) refers to a method of generating and inputting a different password each time, instead of a fixed password. That is, the one-time password refers to an authentication solution that can reduce the exposure of passwords and the possibility of illegal use of user accounts since the reuse of passwords is impossible. That is, the one-time password is used as a two-factor authentication method in financial sites due to its excellent security and mobility, and a hardware token or software token (mobile OTP) generator may be separately required to use the one-time password.

The card company apparatus 150 is a server that can perform the electronic payment by performing the function of paying the cost corresponding to a payment request signal for a pre-registered credit card or check card and authenticating the information related to the credit card or check card. Moreover, the card company apparatus 150 according to this embodiment performs the authentication of the payment method authentication information including at least one of the phone number information, card company identification information, card nickname information, card number information, card expiration date information, virtual card number information, and CVC information, which are received from the payment method registration apparatus 135. Furthermore, the card company apparatus 150 generates an OTP authentication key for the payment method information using the card company OTP providing apparatus 152 connected to the card company apparatus 150. Here, the card company OTP providing apparatus 152 refers to an apparatus that provides an OTP for the card company in conjunction with the card company apparatus 150.

Figure 5:
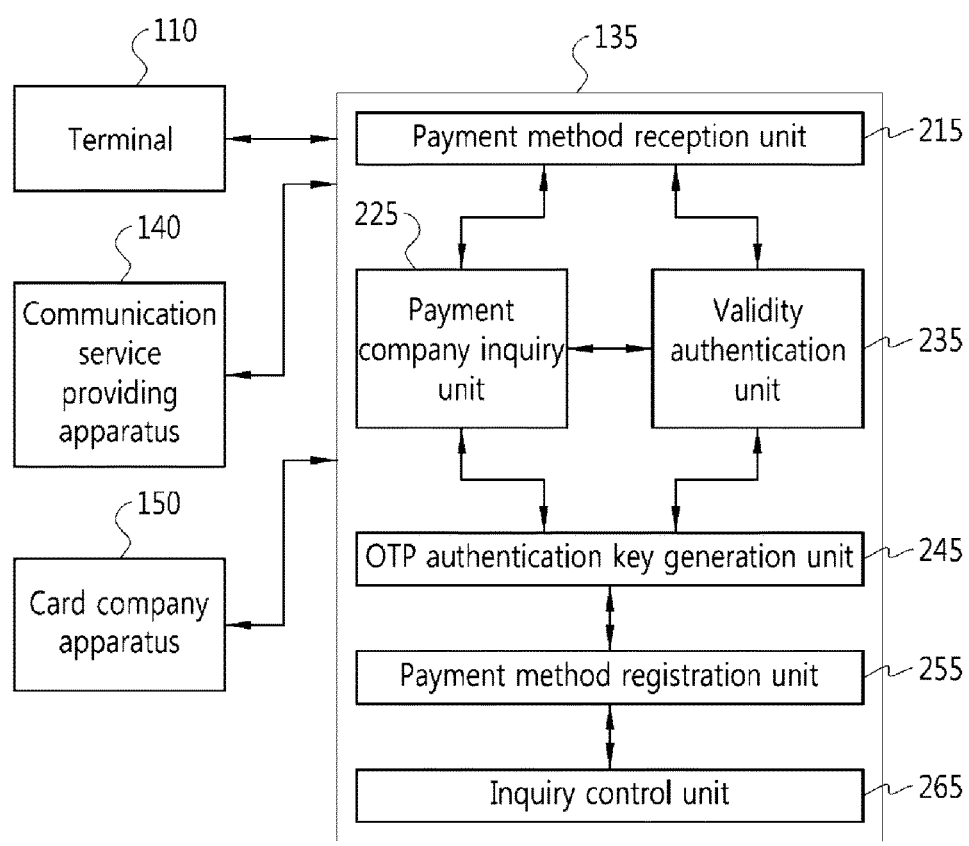
FIG. 5 is a control block diagram of a payment method registration apparatus in accordance with a preferred embodiment of the present invention.

FIG. 5 is a block diagram schematically showing the configuration of a payment method registration apparatus according to the present embodiment.

The payment method registration apparatus 135 according to this embodiment comprises a payment method reception unit 215, a payment company inquiry unit 225, a validity authentication unit 235, an OTP authentication key generation unit 245, a payment method registration unit 255, and an inquiry control unit 265. While it is described in this present embodiment that the terminal 110 comprises only the payment method reception unit 215, the payment company inquiry unit 225, the validity authentication unit 235, the OTP authentication key generation unit 245, the payment method registration unit 255, and the inquiry control unit 265, this is merely illustrative of the spirit of this embodiment of the present invention, and many alterations and modifications may be made to the components included in the payment method registration apparatus 135 by those having ordinary skill in the art without departing from the spirit of the present invention.

The payment method reception unit 215 receives payment method information from the terminal 110. Here, the payment method information includes at least one of credit card information, check card information, phone bill information, and financial account information. For the registration of credit card information, the payment company inquiry unit 225 inquires payment company information depending on the payment method information and, when the payment method included in the payment method information is the credit card information, transmits card company information corresponding to the inquired payment company information to the terminal 110. Meanwhile, for the registration of phone bill information, the payment company inquiry unit 225 inquires the payment company information depending on the payment method information and, when the payment method included in the payment method information is the phone bill information, transmits phone bill registration request information corresponding to the inquired payment company information to the terminal 110.

For the registration of the credit card information, the validity authentication unit 235 authenticates the validity of payment method authentication information received from the terminal 110 using the card company apparatus 150 corresponding to the card company information. Here, the payment method authentication information includes at least one of phone number information, card company identification information, card nickname information, card number information, card expiration date information, virtual card number information, and CVC information. Moreover, for the registration of the credit card information, the validity authentication unit 235 authenticates the validity by transmitting at least one of card nick name information, card number information, card expiration date information, virtual card number information, CVC information, and identification information of the terminal 110.

The OTP authentication key generation unit 245 generates an OTP authentication key using an external device based on the payment method information. For the registration of the credit card information, the OTP authentication key generation unit 245 generates the OTP authentication key for the validated information using the card company OTP providing apparatus 152 connected to the card company apparatus 150. Meanwhile, for the registration of the phone bill information, when phone bill registration information is received from the terminal 110, the OTP authentication key generation unit 245 generates an OTP authentication key for the phone bill registration information using the communication service providing apparatus 140 connected to the terminal 110. Here, the phone bill information includes at least one of phone number information and ID information of the electronic payment application installed in the terminal 110. Moreover, for the registration of the phone bill information, the OTP authentication key generation unit 245 transmits an OTP authentication request signal for the phone number information to the communication service providing apparatus 140 and receives a corresponding OTP authentication key from the communication service providing apparatus 140.

The payment method registration unit 255 registers the payment method information and then transmits the generated OTP authentication key to the terminal 110. For the registration of the credit card information, when at least one of OTP authentication key information, card nickname information, virtual card number information, and validated information is identified, the payment method registration unit 255 registers the payment method information. Meanwhile, when the OTP authentication key is received for the registration of the phone bill information, the payment method registration unit 255 registers the payment method information.

The inquiry control unit 265 controls the payment method information to be inquired or changed in response to a request of the terminal 110. When inquiry request information for the payment method information is received from the terminal to inquire the payment method, the inquiry control unit 265 transmits transaction history identification information inquired through a payment mobile web server or a PG web server to the terminal 110. Meanwhile, when change request information for the payment method information is received from the terminal 110 to change the payment method, the inquiry control unit 265 changes the payment method based on the change request information and transmits change completion information to the terminal 110.

Figure 6:
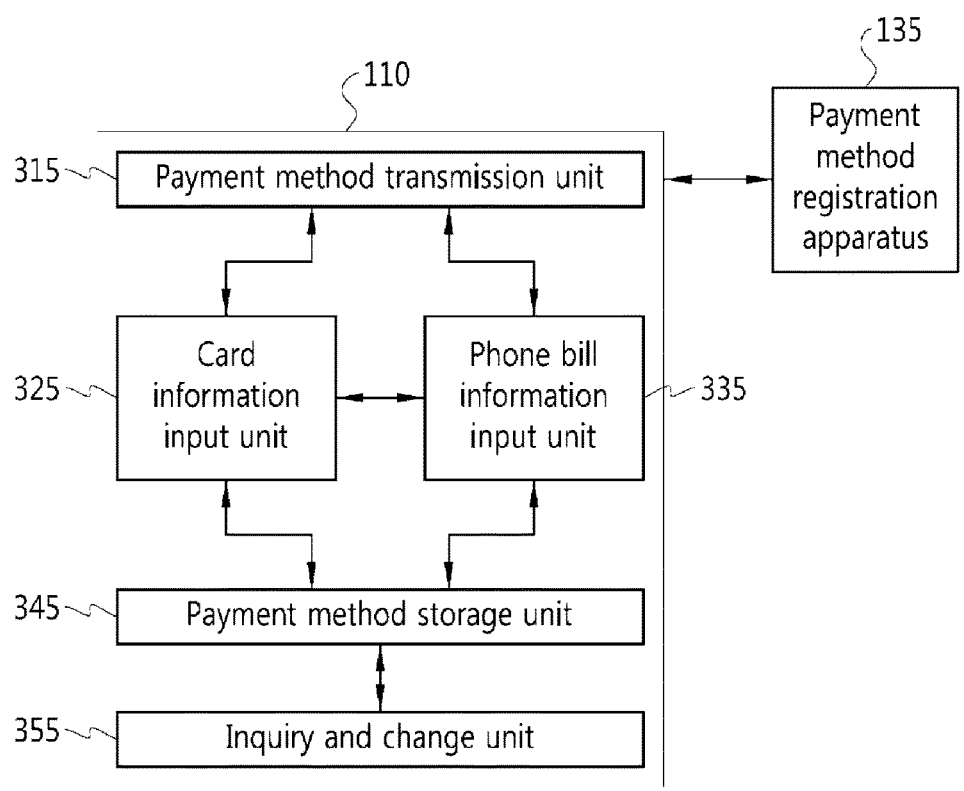
FIG. 6 is a control block diagram of a terminal for payment method registration in accordance with a preferred embodiment of the present invention.

FIG. 6 is a block diagram schematically showing the configuration of a terminal according to the present embodiment.

The terminal 110 according to this embodiment comprises a payment method transmission unit 315, a card information input unit 325, a phone bill information input unit 335, a payment method storage unit 345, and an inquiry and change unit 355. While it is described in this present embodiment that the payment method transmission unit 315, the card information input unit 325, the phone bill information input unit 335, the payment method storage unit 345, and the inquiry and change unit 355, this is merely illustrative of the spirit of this embodiment of the present invention, and many alterations and modifications may be made to the components included in the terminal 110 by those having ordinary skill in the art without departing from the spirit of the present invention. Meanwhile, the payment method transmission unit 315, the card information input unit 325, the phone bill information input unit 335, the payment method storage unit 345, and the inquiry and change unit 355 shown in FIG. 6 may be implemented as the mobile payment application 112.

The payment method transmission unit 315 transmits payment method information selected by the user's manipulation or command to the payment method registration apparatus 135. That is, for the registration of credit card information, the payment method transmission unit 315 transmits payment method information including the credit card information as the payment method to the payment method registration apparatus 135. Meanwhile, for the registration of phone bill information, the payment method registration apparatus 135 transmits payment method information including the phone bill information as the payment method to the payment method registration apparatus 135.

For the registration of the credit card information, the card information input unit 325 selects any one of information from company information received from the payment method registration apparatus 135 and transmits payment method authentication information including at least one of phone number information for the selected company information, card company identification information, card nickname information, card number information, card expiration date information, virtual card number information, and CVC information to the payment method registration apparatus 135. For the registration of the phone bill information, the phone bill information input unit 335 transmits phone bill registration information including at least one of phone number information and electronic payment application ID information depending on phone bill registration request information received from the payment method registration apparatus 135 to the payment method registration apparatus 135.

When the payment method information is authenticated by the payment method registration apparatus 135, the payment method storage unit 345 stores an OTP authentication key received from the payment method registration apparatus 135 in response to the payment method information and then completes the registration of the payment method information. That is, for the registration of the credit card information, when the credit card information as the payment method information is authenticated, the payment method storage unit 345 stores the OTP authentication key received from the payment method registration apparatus 135 in response to the credit card information and then completes the registration of the payment method information. Meanwhile, for the registration of the phone bill information, when the phone bill information as the payment method information is authenticated, the payment method storage unit 345 stores an OTP authentication key received from the payment method registration apparatus 135 in response to the phone bill information and then completes the registration of the payment method information.

The inquiry and change unit 355 transmits inquiry request information or change request information for the payment method information in response to the user's manipulation or command. That is, when the inquiry request information for the payment method information is input by the user's manipulation or command, the inquiry and change unit 355 transmits the inquiry request information to the payment method registration apparatus 135 and receives corresponding transaction history identification information from the payment method registration apparatus 135. Meanwhile, when the change request information for the payment method information is input by the user's manipulation or command, the inquiry and change unit 355 transmits the change request information to the payment method registration apparatus 135 and receives corresponding change completion information from the payment method registration apparatus 135.

Figure 7:
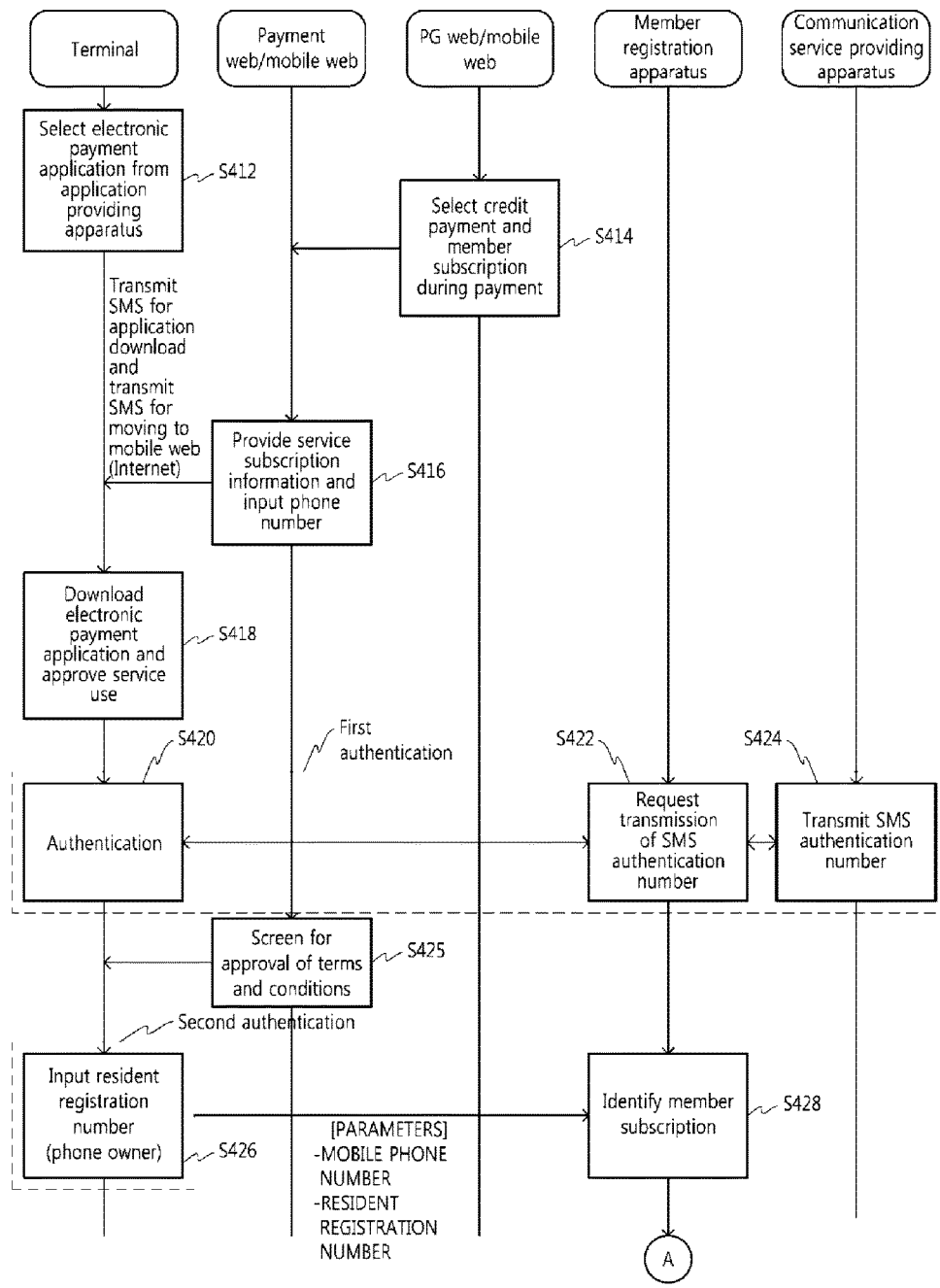
FIGS. 7 and 8 are flowcharts of a member registration method for electronic payment in accordance with a preferred embodiment of the present invention.
Figure 8:
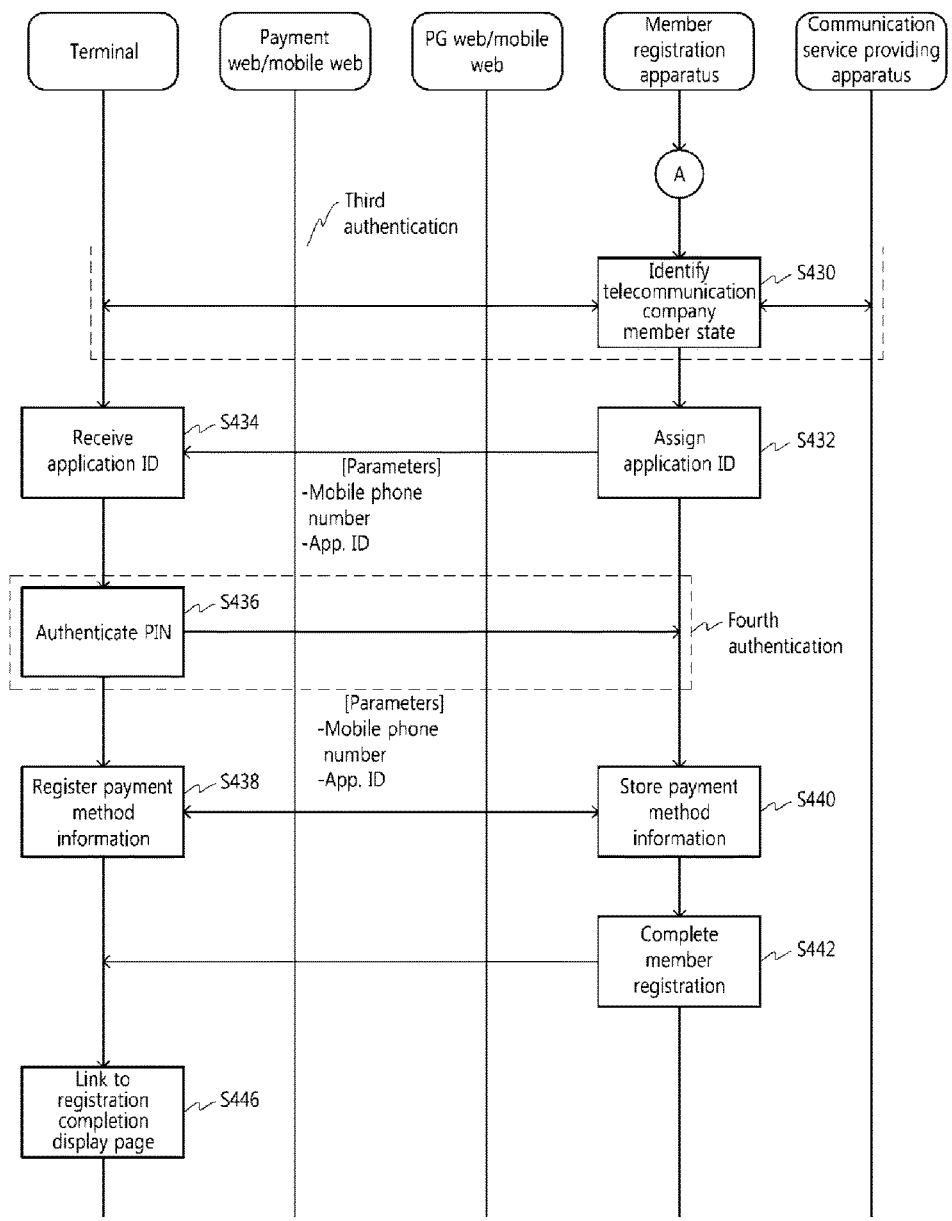

FIGS. 7 and 8 are flowcharts illustrating a member registration method for electronic payment according to the present embodiment.

When the download of the electronic payment application 112 is selected in the application providing apparatus, the application providing apparatus allows the electronic payment application 112 to be downloaded to the corresponding terminal 110 (S412). Moreover, when the download of the electronic payment application 112 is selected by the user's selection during mobile payment through the PG is selected (S414), a payment web or mobile application provides service subscription information, and the electronic payment application 112 is downloaded to the corresponding terminal 110 through the application providing apparatus (S416). In step S414, when the user selects a "credit payment" during mobile payment, a "member subscription" is selected in the PG, and the corresponding information is transmitted to the payment web or mobile application. In step S416, the payment web or mobile application may request input of "service subscription information" and a phone number of the corresponding terminal of the user. At this time, the payment web or mobile application may transmit a message including a call back URL for downloading the electronic payment application 112 or transmit a message including a link for moving to a corresponding web page to the corresponding terminal 110.

The terminal 110 installs the downloaded electronic payment application 112 and, when an approval signal for using the electronic payment application 112 is input (S418), transmits a first authentication request signal to the payment method registration apparatus 135 (S420). In step S420, the terminal 110 transmits a first authentication request signal for approval of execution of the electronic payment application 112 to the payment method registration apparatus 135 and, when first authentication information corresponding to the first authentication request signal is input, determines whether the first authentication information is authenticated. Then, when it is determined that the first authentication information is authenticated, the terminal 110 transmits a first authentication procedure completion signal to the payment method registration apparatus 135. Moreover, in step S420, the terminal 110 receives identification information corresponding to the first authentication request signal from the payment method registration apparatus 135 to perform the first authentication procedure and, when the first authentication information and the identification information coincide with each other, determines that the first authentication information is authenticated. Here, the first authentication information and identification information may preferably be an authentication number comprising a combination of information including at least one of a number, a letter, and a symbol, which are set in advance, but not necessarily limited thereto.

When the first authentication request signal for approval of execution of the electronic payment application 112 is received from the terminal, the payment method registration apparatus 135 requests transmission of a first authentication message from the communication service providing apparatus 140 connected to the terminal 110 (S422). Meanwhile, in step S422, the payment method registration apparatus 135 transmits identification information corresponding to the first authentication message to the terminal 110. Moreover, the payment method registration apparatus 135 may receive the first authentication procedure completion signal for approval of execution of the electronic payment application 112 from the terminal 110.

When a control signal is received from the payment method registration apparatus 135 to transmit the first authentication message, the communication service providing apparatus 140 transmits the first authentication message in a predetermined message specification to the terminal 110 (S424). In step S424, the communication service providing apparatus 140 may use a message center to transmit the first authentication message in the predetermined message specification. Here, the message center may preferably be an SMS center, but not necessarily limited thereto. Meanwhile, the predetermined message specification may preferably be SMS, but not necessarily limited thereto, and may be an IP-based packet message. Moreover, the first authentication message may preferably be an authentication number comprising a combination of information including at least one of a number, a letter, and a symbol, which are set in advance. Therefore, when the user of the terminal 110 that has received the first authentication message inputs the corresponding authentication number to the electronic payment application 112 of the terminal 110, the terminal 110 can perform the first authentication procedure using the electronic payment application 112. Then, the payment web or mobile application may display a screen for approval of terms and conditions (S425).

When the first authentication information is authenticated, the terminal 110 determines whether second authentication information input by the user is authenticated and, when the second authentication information is authenticated, transmits a second authentication procedure completion signal to the payment method registration apparatus 135 (S426). In step S426, when the first authentication information input by the user for approval of execution of the electronic payment application 112 is authenticated, the terminal 110 may transmit the first authentication procedure completion signal to the payment method registration apparatus 135 and then determine whether the second authentication information input by the user is authenticated. Moreover, in step S426, when the second authentication information including at least one of phone number information and resident registration number information on the user of the terminal 110 coincides with the user information of the terminal 110, the terminal 110 determines that the second authentication information is authenticated. At this time, the terminal 110 may determine whether the second authentication information is determined using an internal memory storing the user information of the terminal 110 or the payment method registration apparatus 135.

When the second authentication procedure completion signal is received from the terminal 110, the payment method registration apparatus 135 identifies the member subscription for the user information of the terminal 110 (S428). In step S428, the payment method registration apparatus 135 identifies the member subscription for the user information of the terminal 110 and, when it is determined that the user of the terminal 110 is a non-subscribed member, allows the member registration procedure to be performed. Here, in the case of a subscribed member, the member registration procedure can be performed when the terminal is replaced and thus the electronic payment application is to be newly installed.

When it is determined that the user of the terminal 110 is a subscribed member, the payment method registration apparatus 135 determines whether the telecommunication company member information is authenticated using the communication service providing apparatus 140 connected to the terminal 110 to perform the third authentication procedure and, when it is determined that the telecommunication company member information is authenticated, completes the member registration (S430). In step S430, when there is information that coincides with owner information of the terminal 110 or corporate name information included in the telecommunication company member information, the payment method registration apparatus 135 authenticates the telecommunication company member information using the communication service providing apparatus 140.

When the third authentication procedure is completed, the payment method registration apparatus 135 assigns an application ID to the electronic payment application 112 (S432). The terminal 110 receives the application ID from the method registration apparatus 135 (S434). In step S434, the terminal 110 manages the application ID in the following manner. When the authentication of the second authentication information is determined, the terminal 110 transmits a second authentication procedure completion signal to the payment method registration apparatus 135 and receives the application ID from the method registration apparatus 135.

The terminal 110 receives the application ID from the payment method registration apparatus 135 and, when fourth authentication information input by the user is authenticated, transmits a fourth authentication procedure completion signal to the payment method registration apparatus 135 (S436). In step S436, the terminal 110 performs the fourth authentication procedure in the following manner.

When the fourth authentication information including the PIN input by the user is authenticated, the terminal 110 encrypts the application ID and authentication key, stores the encrypted application ID and authentication key, and transmits the fourth authentication procedure completion signal to the payment method registration apparatus 135.

Then, the terminal 110 registers payment method information input by the user (S438). In step S438, the terminal 110 registers the payment method information in the following manner. The terminal 110 registers at least one of credit card information, check card information, phone bill information, and financial account information, which are input by the user, as the payment method information. The payment method registration apparatus 135 stores the payment method information received from the terminal 110 (S440). When the fourth authentication procedure completion signal is received from the terminal 110, the payment method registration apparatus 135 completes the member registration for the user information of the terminal 110 (S442). When a registration completion signal is received from the payment method registration apparatus 135, the terminal 110 completes the member registration for the user information of the terminal 110 (S446). In step S446, when the registration completion signal is received from the payment method registration apparatus 135 for the member registration, the terminal 110 outputs a registration completion display page.

While it is described in FIGS. 7 and 8 that steps S412 to S446 are sequentially performed, this is merely illustrative of the spirit of the embodiment of the present invention, and many alterations and modifications may be made to the steps described in FIGS. 7 and 8 in a manner that the sequence shown in FIGS. 7 and 8 is changed or at least two of steps S412 to S446 are performed in parallel by those having ordinary skill in the art without departing from the spirit of the present invention, and thus FIGS. 7 and 8 are not limited to the time-series sequence.

Figure 9:
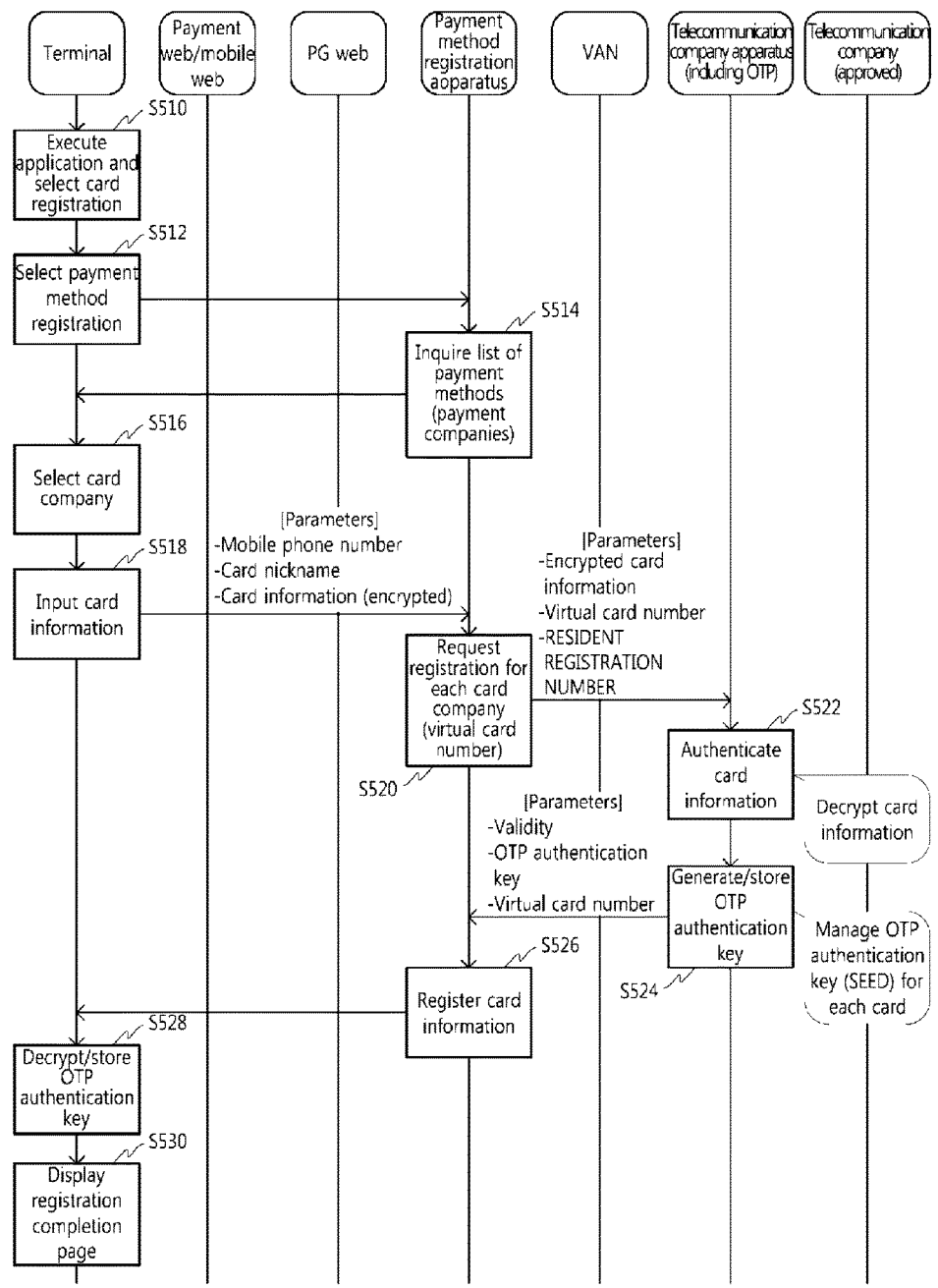
FIG. 9 is a flowchart of a credit card registration method in accordance with a preferred embodiment of the present invention.

FIG. 9 is a flowchart illustrating a credit card registration method according to the present embodiment.

When the download of the electronic payment application 112 is selected in the application providing apparatus, the application providing apparatus allows the electronic payment application 112 to be downloaded to the corresponding terminal. Moreover, when the download of the electronic payment application 112 is selected by the user's selection during mobile payment through the PG is selected, the payment web or mobile application provides service subscription information, and the electronic payment application 112 is downloaded to the corresponding terminal 110 through the application providing apparatus, and at this time, the terminal 110 selects a "credit card registration" as the electronic method during the electronic payment in response to the user's manipulation or command (S510).

The terminal 110 generates payment method information including credit card information using the electronic payment application 112 and transmits the payment method information including the credit card information as the payment method to the payment method registration apparatus 135 (S512). The payment method registration apparatus 135 receives the payment method information from the terminal 110, inquires payment company information (a list of payment methods) depending on the payment method information, and when the payment method included in the payment method information is the credit card information, transmits card company information corresponding to the inquired payment company information to the terminal 110 (S514).

The terminal 110 selects any one of information from company information received from the payment method registration apparatus 135 (S516) and transmits payment method authentication information including at least one of phone number information for the selected company information, card company identification information, card nickname information, card number information, card expiration date information, virtual card number information, and CVC information to the payment method registration apparatus 135 (S518).

The payment method registration apparatus 135 requests the authentication of the payment method authentication information from the card company apparatus 150 corresponding to the credit card information to request the registration of the payment method authentication information for each card company during the registration of the credit card information (S520). That is, in step S520, for the authentication of the validity of the credit card during the registration of the credit card information, the payment method registration apparatus 135 may authenticate the validity of the payment method authentication information received from the terminal 110 using the card company apparatus 150 corresponding to the card company information. Here, the payment method authentication information includes at least one of phone number information, card company identification information, card nickname information, card number information, card expiration date information, virtual card number information, and CVC information, and the card nickname information refers to the information input by the user's manipulation or command. At this time, the payment method registration apparatus 135 transmits at least one of card nickname information, phone number information, card expiration date information, virtual card number information, CVC information, and identification information of the terminal 110 to the card company apparatus 150 to authenticate the validity.

The card company apparatus 150 performs the authentication of the payment method authentication information including at least one of phone number information, card company identification information, card nickname information, card number information, card expiration date information, virtual card number information, and CVC information, which are received from the payment method registration apparatus 135 (S522). Furthermore, the card company apparatus 150 generates an OTP authentication key for the payment method information using the card company OTP providing apparatus 152 connected to the card company apparatus 150 (S524). That is, in step S534, for the generation of the OTP authentication key during the registration of the credit card information, the payment method registration apparatus 135 can generate the OTP authentication key for the validated information or the virtual card number information using the card company OTP providing apparatus 152 connected to the card company apparatus 150.

The payment method registration apparatus 135 registers the credit card information as the payment method information and then transmits the OTP authentication key to the terminal 110 (S526). In step S526, when at least one of the OTP authentication key, card nickname information, virtual card number information, and validated information is identified, the payment method registration apparatus 135 registers the credit card information as the payment method information. The terminal 110 stores an OTP authentication key received from the payment method registration apparatus 135 in response to the payment method information (S528) and then completes the registration of the payment method information (S530).

While it is described in FIG. 9 that steps S510 to S530 are sequentially performed, this is merely illustrative of the spirit of the embodiment of the present invention, and many alterations and modifications may be made to the steps described in FIG. 9 in a manner that the sequence shown in FIG. 9 is changed or at least two of steps S510 to S530 are performed in parallel by those having ordinary skill in the art without departing from the spirit of the present invention, and thus FIG. 9 is not limited to the time-series sequence.

As mentioned above, the credit card registration method shown in FIG. 9 according the present embodiment may be implemented in a program and recorded on a computer-readable medium. The computer-readable medium on which the program for implementing the credit card registration method according to this embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet).

Figure 10:
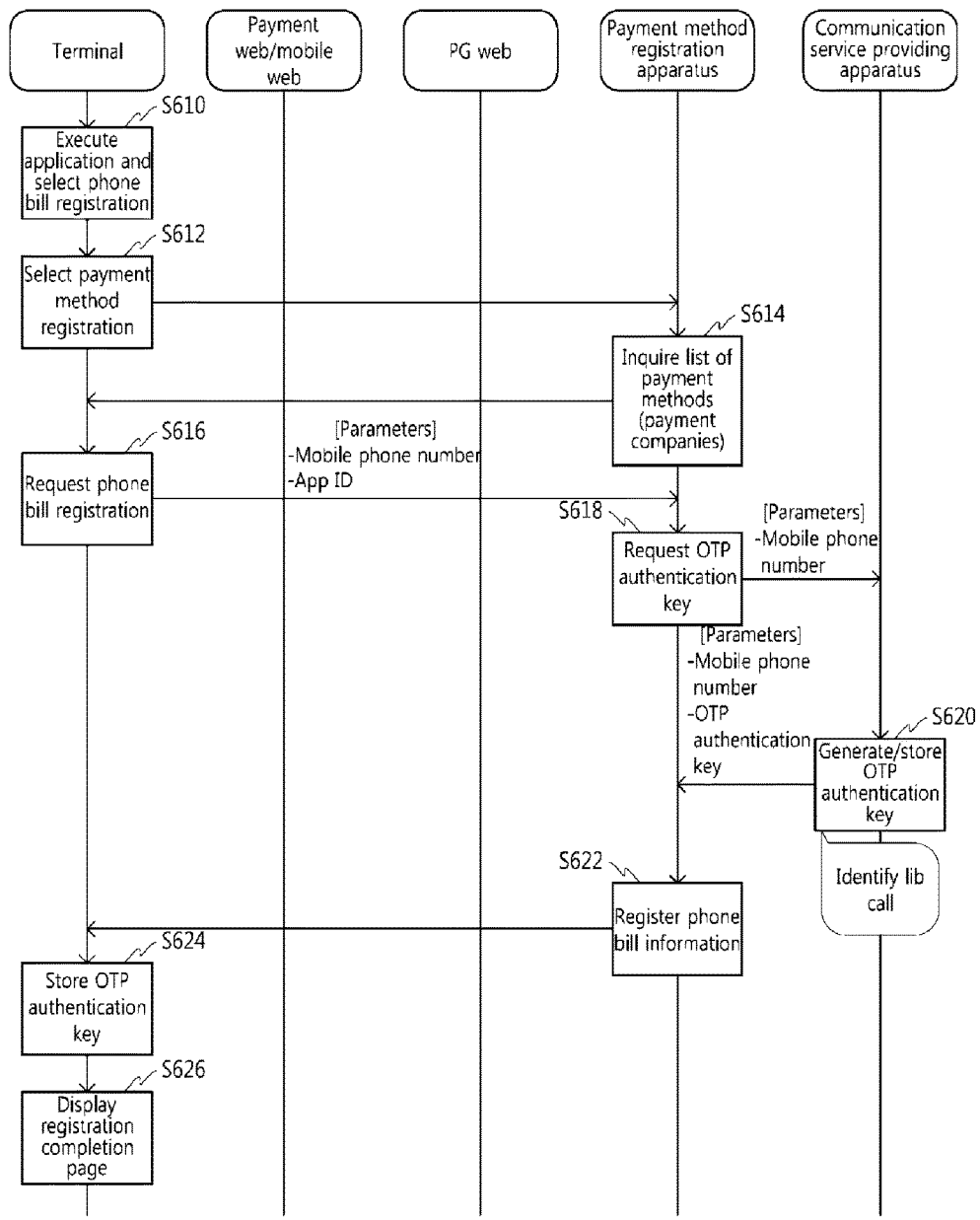
FIG. 10 is a flowchart of a phone bill registration method in accordance with a preferred embodiment of the present invention.

FIG. 10 is a flowchart illustrating a phone bill registration method according to the present embodiment.

When the download of the electronic payment application 112 is selected in the application providing apparatus, the application providing apparatus allows the electronic payment application 112 to be downloaded to the corresponding terminal. Moreover, when the download of the electronic payment application 112 is selected by the user's selection during mobile payment through the PG is selected, the payment web or mobile application provides service subscription information, and the electronic payment application 112 is downloaded to the corresponding terminal 110 through the application providing apparatus, and at this time, the terminal 110 selects "phone bill registration" as the electronic method during the electronic payment in response to the user's manipulation or command (S610).

The terminal 110 generates payment method information including phone bill information using the electronic payment application 112 and transmits the payment method information including the phone bill information as the payment method to the payment method registration apparatus 135 (S612). The payment method registration apparatus 135 inquires payment company information (a list of payment methods) depending on the payment method information, and when the payment method included in the payment method information is the phone bill information, transmits phone bill registration request information corresponding to the inquired payment company information to the terminal 110 (S614).

The terminal 110 transmits phone bill registration information including at least one of phone number information and electronic payment application ID information depending on the phone bill registration request information received from the payment method registration apparatus 135 to the payment method registration apparatus (S616). For the generation of an OTP authentication key during registration of a phone bill, when the phone bill registration information is received from the terminal 110, the payment method registration apparatus 135 transmits an OTP authentication key request signal to the communication service providing apparatus 140 connected to the terminal 110 (S618). Here, the phone bill information includes at least one of phone number information and ID information of the electronic payment application installed in the terminal 110. When the OTP authentication key request signal is received from the payment method registration apparatus 135, the communication service providing apparatus 140 generates an OTP authentication key through the telecommunication company OTP providing apparatus 142 connected thereto and transmits the generated OTP authentication key to the payment method registration apparatus 135 (S620).

For the generation of the OTP authentication key during the registration of the phone bill, the payment method registration apparatus 135 receives the OTP authentication key corresponding to the OTP authentication request signal for the phone number information from the communication service providing apparatus 140 and then transmits the received OTP authentication key to the terminal 110 (S622). In step S622, when the OTP authentication key is identified for the registration of the payment method, the payment method registration apparatus 135 registers the phone bill information as the payment method information. The terminal 110 stores the OTP authentication key received from the payment method registration apparatus 135 in response to the phone bill information as the payment method information (S624) and then completes the registration of the payment method information (S626).

While it is described in FIG. 10 that steps S610 to S626 are sequentially performed, this is merely illustrative of the spirit of the embodiment of the present invention, and many alterations and modifications may be made to the steps described in FIG. 10 in a manner that the sequence shown in FIG. 10 is changed or at least two of steps S610 to S626 are performed in parallel by those having ordinary skill in the art without departing from the spirit of the present invention, and thus FIG. 10 is not limited to the time-series sequence.

As mentioned above, the phone bill registration method shown in FIG. 10 according the present embodiment may be implemented in a program and recorded on a computer-readable medium. The computer-readable medium on which the program for implementing the phone bill registration method according to this embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet).

Figure 11:
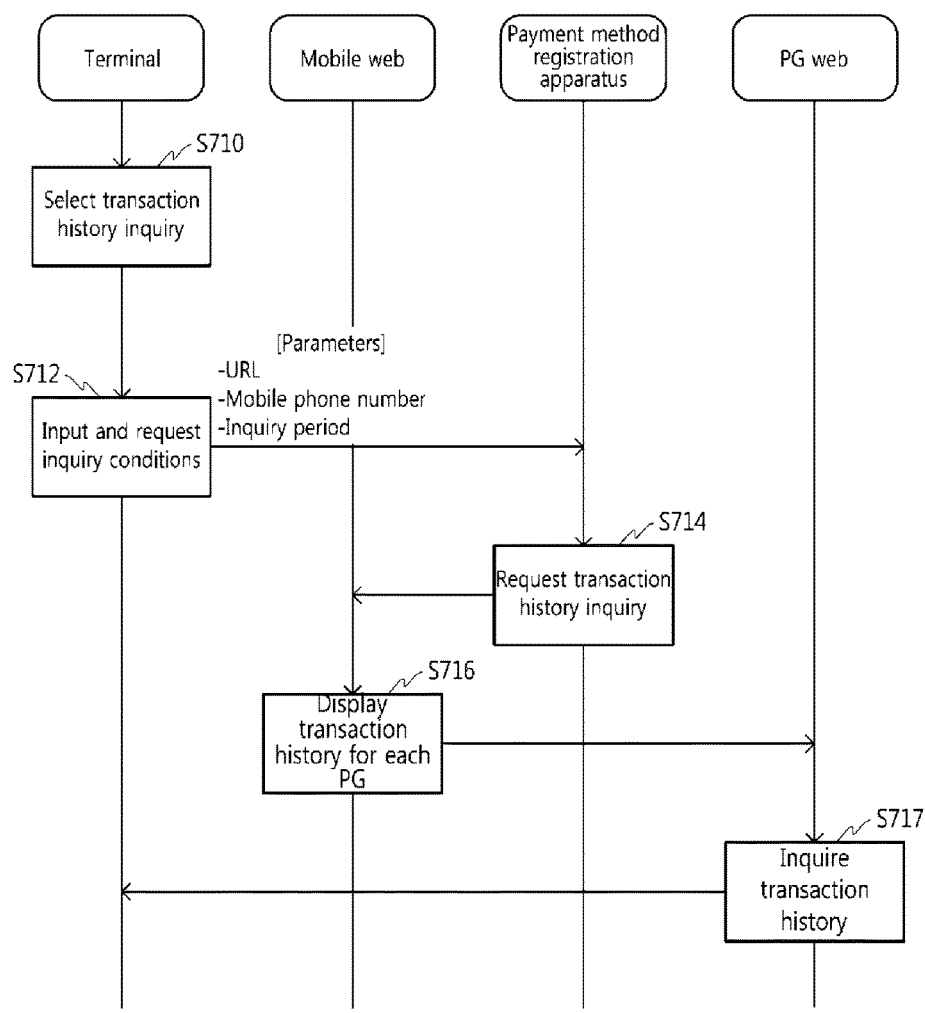
FIG. 11 is a flowchart of a transaction history inquiry method in accordance with a preferred embodiment of the present invention.

FIG. 11 is a flowchart illustrating a transaction history inquiry method according to the present embodiment.

The terminal 110 receives a transaction history inquiry request signal for inquiring the payment method through the electronic payment application 112 in response to the user's manipulation or command (S710). The terminal 110 transmits inquiry condition information or inquiry request information for the transaction history inquiry request signal received through the electronic payment application 112 to the payment method registration apparatus 135 (S712). Here, the inquiry condition information or inquiry request information includes at least one of URL information, phone number information, ID information of the electronic payment application 112, and inquiry period information. That is, in steps S712 and S712, when the inquiry request information for the payment method information is input by the user's manipulation or command, the terminal 110 transmits the inquiry request information to the payment method registration apparatus 135.

The payment method registration apparatus 135 transmits the transaction history inquiry request information to a mobile web to inquire the transaction history corresponding to the inquiry condition information or inquiry request information received from the terminal 110 (S714). The mobile web identifies the transaction history for each PG and transmits the identification result to a PB web (S716). The PG web transmits transaction history inquiry response information corresponding to the transaction history inquiry request information requested by the payment method registration apparatus 135 to the terminal 110 (S717). That is, in steps S714 to S717, when the inquiry request signal for the payment method information is received from the terminal 110, the payment method registration apparatus 135 transmits transaction history identification information inquired through a payment mobile web server or a PG web server to the terminal 110. Moreover, in step S717, the terminal 110 receives the transaction history identification information corresponding to the inquiry request information for the payment method information from the payment method registration apparatus 135.

While it is described in FIG. 11 that steps S710 to S717 are sequentially performed, this is merely illustrative of the spirit of the embodiment of the present invention, and many alterations and modifications may be made to the steps described in FIG. 11 in a manner that the sequence shown in FIG. 11 is changed or at least two of steps S710 to S717 are performed in parallel by those having ordinary skill in the art without departing from the spirit of the present invention, and thus FIG. 11 is not limited to the time-series sequence.

Figure 12:
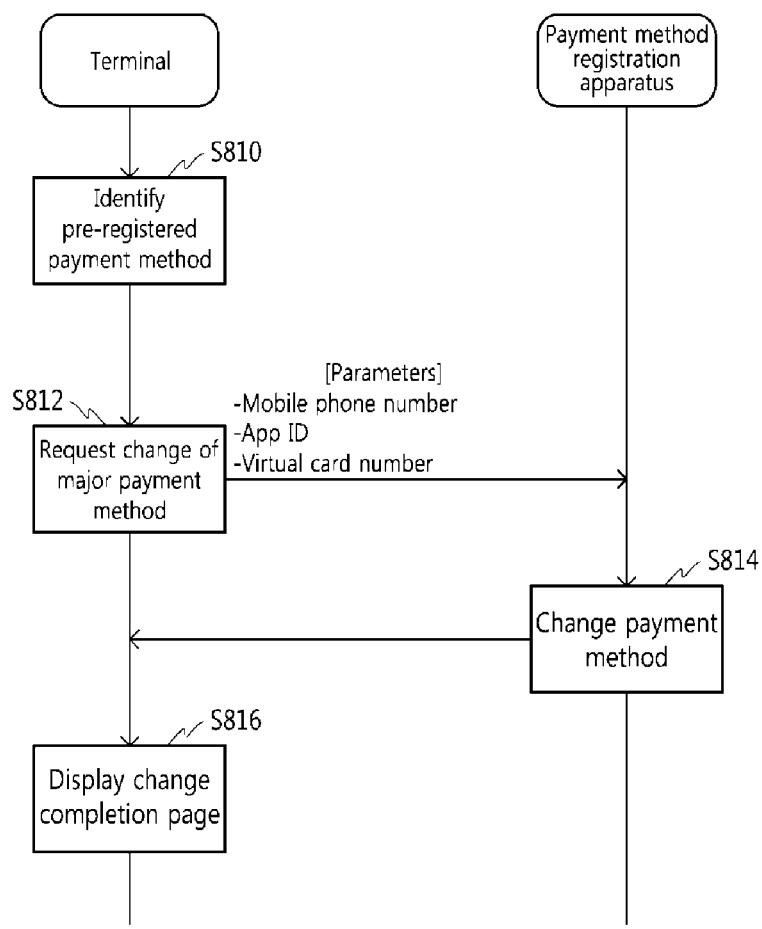
FIG. 12 is a flowchart of a major payment method change method in accordance with a preferred embodiment of the present invention.

FIG. 12 is a flowchart illustrating a major payment method change method according to the present embodiment.

When change request information for the payment method information is input by the user's manipulation or command to change the payment method (S810), the terminal 110 transmits the change request information to the payment method registration apparatus 135 (S8112). Here, the change request information includes at least one of phone number information, ID information of the electronic payment application 112, card nickname information, and virtual card number information.

When the change request information for the payment method information is received from the terminal 110, the payment method registration apparatus 135 changes the payment method based on the change request information and transmits change completion information to the terminal 110 (S814). The terminal 110 receives the change completion information corresponding to the change request information from the payment method registration apparatus 135 and then completes the change of the payment method (S816).

While it is described in FIG. 12 that steps S810 to S816 are sequentially performed, this is merely illustrative of the spirit of the embodiment of the present invention, and many alterations and modifications may be made to the steps described in FIG. 12 in a manner that the sequence shown in FIG. 12 is changed or at least two of steps S810 to S816 are performed in parallel by those having ordinary skill in the art without departing from the spirit of the present invention, and thus FIG. 12 is not limited to the time-series sequence.

The above description is merely intended to illustratively describe the technical spirit of the present invention, and various changes and modifications can be made by those skilled in the art to which the present invention pertains without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims and all technical spirits falling within the equivalent scope thereof should be interpreted as being included in the scope of the present invention.

INDUSTRIAL APPLICABILITY

The present invention can be used for a member registration method for electronic payment, a system, an apparatus, and a terminal for the same, which enables secure electronic payment by performing member registration depending on whether information input by a user through a terminal to perform the electronic payment is authenticated and can register a payment method more safely by performing one-time password (OTP) authentication depending on payment method information selected by the user through the terminal to perform the electronic payment.

The invention claimed is:

1. A terminal, comprising:
a microprocessor which controls units of the terminal;
a first authentication procedure performing unit which, upon first authentication information input by a user for approval of execution of an electronic payment application is authenticated, transmits a first authentication procedure completion signal to a member registration apparatus;
a second authentication procedure performing unit which determines whether second authentication information input by the user is authenticated, after the first authentication information is authenticated and the execution of the electronic payment application is approved;
an application ID management unit which, upon the second authentication information is authenticated, transmits a second authentication procedure completion signal to the member registration apparatus and receives an application ID from the member registration apparatus;
a fourth authentication procedure performing unit which, upon fourth authentication information input by the user is authenticated, transmits a fourth authentication procedure completion signal to the member registration apparatus, after receiving the application ID from the member registration device;
a payment method registration unit which registers payment method information input by the user; and
a registration processing unit which receives a registration completion signal from the member registration apparatus and then completes the member registration,
wherein the fourth authentication information includes a personal identification number (PIN),
wherein, upon the user inputs the PIN incorrectly more than a predetermined number of times in succession, the PIN is reset by inputting a personal unblocking key (PUK),
wherein the first authentication procedure performing unit transmits a first authentication request signal for approval of execution of the electronic payment application to the member registration apparatus, receives identification information transferred from the member registration apparatus in response to the first authentication request signal, and upon the first authentication information coincides with the identification information, transmits the first authentication procedure completion signal to the member registration apparatus,
wherein upon the second authentication information including at least one of phone number information given to the terminal and resident registration number information on the user of the terminal coincides with the user information of the terminal, the second authentication procedure performing unit determines that the second authentication information is authenticated,
wherein upon the fourth authentication information including a personal identification number (PIN) input by the user is authenticated, the fourth authentication procedure performing unit encrypts the application ID and authentication key, stores the encrypted application ID and authentication key, and transmits the fourth authentication procedure completion signal to the member registration apparatus, and
wherein the registration processing unit transmits payment method information selected by the user to the payment method registration apparatus, upon the payment method information is authenticated, the terminal is configured to:
receive an encrypted one-time password (OTP) authentication key from the payment method registration apparatus in response to the payment method information;
decrypt the encrypted OTP authentication key;
re-encrypt the decrypted OTP authentication key together with a PIN information required for the authentication; and
store the re-encrypted OTP authentication key.

2. The terminal of claim 1, wherein the first authentication information and identification information comprise an authentication number comprising a combination of information including at least one of a number, a letter, and a symbol, which are set in advance.

3. A member registration method for electronic payment, in which member registration is performed by a terminal comprising a microprocessor which performs steps of the member registration method, the member registration method comprising:
a first authentication procedure performing step of, upon first authentication information input by a user for approval of execution of an electronic payment application is authenticated, transmitting a first authentication procedure completion signal to a member registration apparatus;
second authentication procedure performing step of determining whether second authentication information input by the user is authenticated, after the first authentication information is authenticated and the operation of the electronic payment application is approved;
an application ID management step of, upon the second authentication information is authenticated, transmitting a second authentication procedure completion signal to the member registration apparatus and receiving an application ID from the member registration apparatus;
a fourth authentication procedure performing step of, upon fourth authentication information input by the user is authenticated, transmitting a fourth authentication procedure completion signal to the member registration apparatus, after receiving the application ID from the member registration device;
a payment method registration step of registering payment method information input by the user; and
a registration processing step of receiving a registration completion signal from the member registration apparatus and then completing the member registration, wherein the fourth authentication information includes a personal identification number (PIN), wherein, upon the user inputs the PIN incorrectly more than a predetermined number of times in succession, the PIN is reset by inputting a personal unblocking key (PUK), wherein the first authentication procedure performing step includes:

transmitting a first authentication request signal for approval of execution of the electronic payment application to the member registration apparatus, receiving identification information transferred from the member registration apparatus in response to the first authentication request signal, and upon the first authentication information coincides with the identification information, transmitting the first authentication procedure completion signal to the member registration apparatus, wherein upon the second authentication information including at least one of phone number information given to the terminal and resident registration number information on the user of the terminal coincides with the user information of the terminal, the second authentication procedure performing step determines that the second authentication information is authenticated, and wherein upon the fourth authentication information including a personal identification number (PIN) input by the user is authenticated, the fourth authentication procedure performing step includes:

encrypts encrypting the application ID and authentication key, stores storing the encrypted application ID and authentication key, and transmits transmitting the fourth authentication procedure completion signal to the member registration apparatus, and wherein the registration processing step includes:

transmitting payment method information selected by the user to the payment method registration apparatus, upon the payment method information is authenticated, receiving an encrypted one-time password (OTP) authentication key from the payment method registration apparatus in response to the payment method information, decrypting the encrypted OTP authentication key, re-encrypting the decrypted OTP authentication key together with a PIN information required for the authentication, and storing the re-encrypted OTP authentication key.

\* \* \* \* \*